(12) United States Patent
Kim et al.

(10) Patent No.: US 11,561,969 B2
(45) Date of Patent: Jan. 24, 2023

(54) UTILIZING LOGICAL-FORM DIALOGUE GENERATION FOR MULTI-TURN CONSTRUCTION OF PAIRED NATURAL LANGUAGE QUERIES AND QUERY-LANGUAGE REPRESENTATIONS

(71) Applicant: Adobe Inc., San Jose, CA (US)

(72) Inventors: Doo Soon Kim, San Jose, CA (US); Anthony M Colas, Gainesville, FL (US); Franck Dernoncourt, Sunnyvale, CA (US); Moumita Sinha, Cupertino, CA (US); Trung Bui, San Jose, CA (US)

(73) Assignee: Adobe Inc., San Jose, CA (US)

( * ) Notice: Subject to any disclaimer, the term of this patent is extended or adjusted under 35 U.S.C. 154(b) by 41 days.

(21) Appl. No.: 16/834,850

(22) Filed: Mar. 30, 2020

(65) Prior Publication Data
US 2021/0303555 A1 Sep. 30, 2021

(51) Int. Cl.
*G06F 16/00* (2019.01)
*G06F 16/242* (2019.01)
*G06F 16/28* (2019.01)

(52) U.S. Cl.
CPC ........ *G06F 16/243* (2019.01); *G06F 16/2428* (2019.01); *G06F 16/2433* (2019.01); *G06F 16/284* (2019.01)

(58) Field of Classification Search
CPC .............. G06F 16/243; G06F 16/2428; G06F 16/2433; G06F 16/284; G06F 17/30427;
(Continued)

(56) References Cited

U.S. PATENT DOCUMENTS

| | | | |
|---|---|---|---|
| 2018/0174585 A1* | 6/2018 | Andreas | G06F 40/35 |
| 2018/0276273 A1* | 9/2018 | Mittal | G06F 40/30 |
| 2019/0385611 A1* | 12/2019 | Smythe | G06F 40/40 |

OTHER PUBLICATIONS

Finegan-Dollak, C., Kummerfeld, J. K., Zhang, L., Ramanathan, K., Sadasivam, S., Zhang, R., & Radev, D. (Jul. 2018). Improving Text-to-SQL Evaluation Methodology. In Proceedings of the 56th Annual Meeting of the Association for Computational Linguistics (Volume 1: Long Papers) (pp. 351-360).
(Continued)

*Primary Examiner* — Ashish Thomas
*Assistant Examiner* — Suman Rajaputra
(74) *Attorney, Agent, or Firm* — Keller Preece PLLC

(57) ABSTRACT

The present disclosure relates to systems, methods, and non-transitory computer-readable media for generating pairs of natural language queries and corresponding query-language representations. For example, the disclosed systems can generate a contextual representation of a prior-generated dialogue sequence to compare with logical-form rules. In some implementations, the logical-form rules comprise trigger conditions and corresponding logical-form actions for constructing a logical-form representation of a subsequent dialogue sequence. Based on the comparison to logical-form rules indicating satisfaction of one or more trigger conditions, the disclosed systems can perform logical-form actions to generate a logical-form representation of a subsequent dialogue sequence. In turn, the disclosed systems can apply a natural-language-to-query-language (NL2QL) template to the logical-form representation to generate a natural language query and a corresponding query-language representation for the subsequent dialogue sequence.

20 Claims, 10 Drawing Sheets

(58) Field of Classification Search
CPC ......... G06F 17/30569; G06F 17/30595; G06F 17/30864; G06F 9/4448
See application file for complete search history.

(56) References Cited

OTHER PUBLICATIONS

Ganitkevitch, J., Van Durme, B., & Callison-Burch, C. (Jun. 2013). PPDB: The paraphrase database. In Proceedings of the 2013 Conference of the North American Chapter of the Association for Computational Linguistics: Human Language Technologies (pp. 758-764).

Iyer, S., Konstas, I., Cheung, A., Krishnamurthy, J., & Zettlemoyer, L. (2017). Learning a neural semantic parser from user feedback. arXiv preprint arXiv:1704.08760.

Saha, A., Pahuja, V., Khapra, M. M., Sankaranarayanan, K., & Chandar, S. (Apr. 2018). Complex sequential question answering: Towards learning to converse over linked question answer pairs with a knowledge graph. In Thirty-Second AAAI Conference on Artificial Intelligence.

Shah, P., Hakkani-Tür, D., Tür, G., Rastogi, A., Bapna, A., Nayak, N., & Heck, L. (2018). Building a conversational agent overnight with dialogue self-play. arXiv preprint arXiv:1801.04871.

Wang, Y., Berant, J., & Liang, P. (Jul. 2015). Building a semantic parser overnight. In Proceedings of the 53rd Annual Meeting of the Association for Computational Linguistics and the 7th International Joint Conference on Natural Language Processing (Volume 1: Long Papers) (pp. 1332-1342).

I. Androutsopoulos, G. D. Ritchie, and P. Thanisch. 1995. Natural Language Interfaces to Databases—An Introduction. Natural Language Engineering, 1(709):29-81.

Rodolfo A. Pazos Rangel, Juan Javier Gonzalez Barbosa, Marco Antonio Aguirre Lam, Jose Antonio Martinez Flores, and Hector J. Fraire Huacuja. 2013. Natural language interfaces to databases: An analysis of the state of the art. Springer Berlin Heidelberg, Berlin, Heidelberg.

Luke Zettlemoyer and Michael Collins. 2005. Learning to Map Sentences to Logical Form : Structured Classification with Probabilistic Categorial Grammars. 21st Conference on Uncertainty in Artificial Intelligence, pp. 658-666.

Percy Liang, Michael I Jordan, and Dan Klein. 2011. Learning dependency-based compositional semantics. In Proceedings of the 49th Annual Meeting of the Association for Computational Linguistics: Human Language Technologies—vol. 1, pp. 590-599, Portland, Oregon.

Ana-Maria Popescu, Alex Armanasu, Oren Etzioni, David Ko, and Alexander Yates. 2004. Modern natural language interfaces to databases: composing statistical parsing with semantic tractability. In Proceedings of the 20th International Conference on Computational Linguistics, pp. 141-147.

* cited by examiner

UTILIZING LOGICAL-FORM DIALOGUE GENERATION FOR MULTI-TURN CONSTRUCTION OF PAIRED NATURAL LANGUAGE QUERIES AND QUERY-LANGUAGE REPRESENTATIONS

BACKGROUND

Many users communicate with chatbots and AI assistants for help on using software applications. Thus, recent years have seen significant improvements in hardware and software platforms that facilitate responses to natural language questions received from users. To do so, query-response systems utilize a variety of different models and methodologies to respond to natural language questions. Often, these query-response systems employ a training process to learn a conversion between query language and natural language, thereby enabling automated responses. Unfortunately, a number of problems exist with conventional data collection methods including conventional (semi)automatic data-generation systems that generate datasets for use in training such query-response systems. As demonstrated below, some example problems of conventional data collection methods comprise decreased applicability to new domains, reduced accuracy of training data, and diminished model flexibility of training data generation architecture.

In some conventional (semi)automatic data-generation systems, the output comprises datasets that are highly tailored for training a specific machine-learning model based on a particular knowledge base or software domain. This approach undermines cross-application of query-response systems. That is, query-response systems are largely domain-dependent and lack transferability to different knowledge bases or software domains. Thus, due to an inability of conventional data collection methods to generate applicable training datasets in a scalable and transferrable fashion, conventional data systems are severely limited in their application.

In addition, some conventional data collection methods suffer from decreased data accuracy. For example, generating a dataset typically entails large amounts of user input processing (e.g., for labelling, annotation, query modification, query formulation, etc.). This approach can lead to training data that is error-prone, subjective, and inconsistent.

Further, some conventional (semi)automatic data-generation systems include a rigid model architecture. For example, some conventional data generation systems can only analyze and/or generate first-turn utterances (e.g., single, standalone dialogue sequences). Additionally or alternatively, some conventional data generation systems accept only predetermined dialogue sequences (or scripted dialogue) while others may require multiple user feedback loops and/or multiple re-training steps to train a query-response system. These and/or other example problems limit the performance and capability of conventional data collection methods.

SUMMARY

Aspects of the present disclosure can include methods, computer-readable media, and systems that utilize a logical-form dialogue generator to construct a natural-language-to-query-language (NL2QL) dataset. In particular, the disclosed systems utilize the logical-form dialogue generator to generate diverse and coherent conversational datasets comprising pairs of natural language queries and corresponding query-language representations (e.g., in structured query language ("SQL") or SPARQL protocol and RDF query language ("SPARQL")). In some embodiments, utilizing the logical-form dialogue generator comprises employing a specific framework, namely a logical-form specification. The logical-form specification represents a set of database operations such as retrieving instances, retrieving properties of the instances, and performing computational operations. Under the framework of the logical-form specification, the disclosed systems can apply contextual information, which captures data included in a previously generated utterance or dialogue turn, to a variety of logical-form rules. The logical-form rules describe how the disclosed systems construct a logical-form representation of a next dialogue turn in view of the contextual information. After constructing the logical-form representation of the next dialogue turn, the disclosed systems can then apply the logical-form representation to a NL2QL template for generating a pair of a natural language query and a query language representation (a NL2QL pair) of the next dialogue turn. In this manner, the disclosed systems can iteratively generate NL2QL pairs for multiple dialogue turns grouped together as a single (and more robust) dialogue session.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
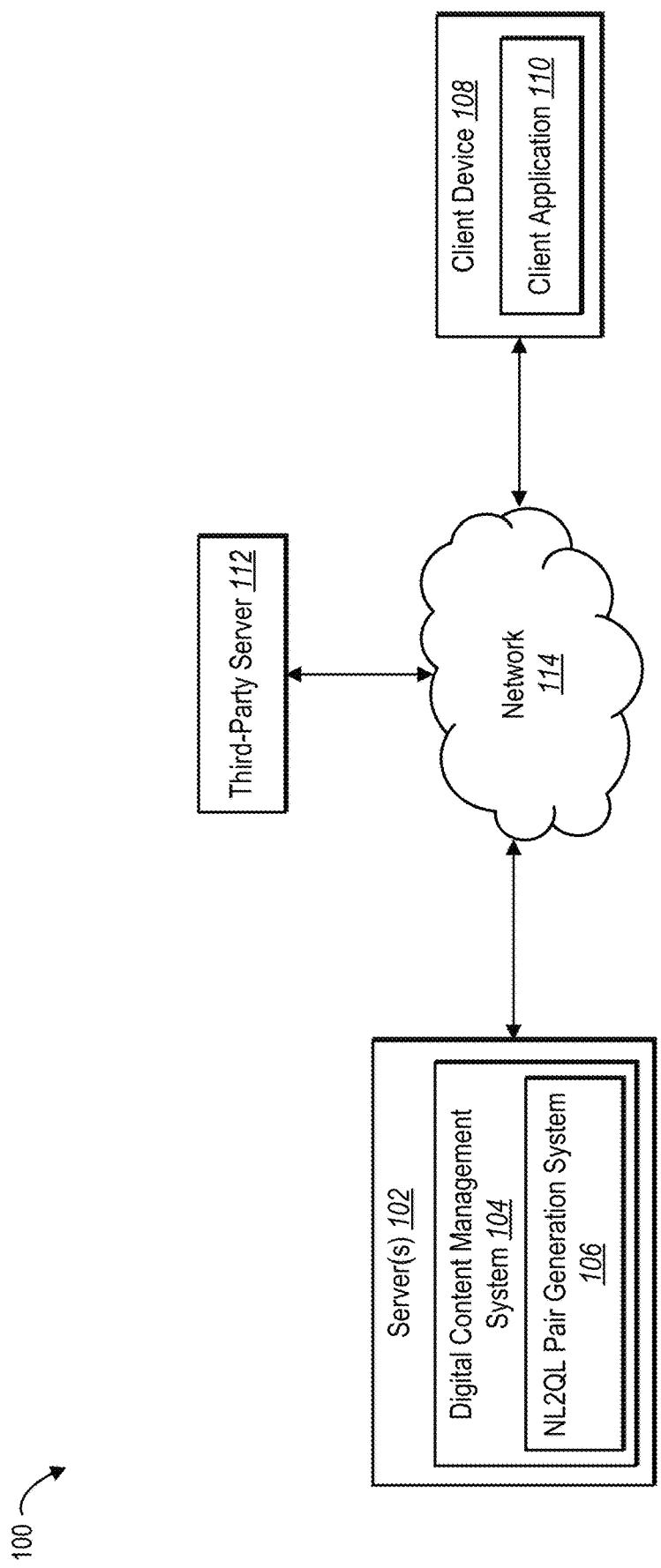
FIG. 1 illustrates a diagram of a system including a NL2QL pair generation system in accordance with one or more embodiments.

One or more embodiments described herein include a NL2QL pair generation system that utilizes logical-form dialogue generation for multi-turn construction of paired natural language queries and query-language representations. For example, in one or more embodiments, the NL2QL pair generation system exploits inputs comprising a database, lexicon, and an ontology to rapidly generate a large-scale dataset of paired natural language queries and query-language representations. To do so, in some embodiments the NL2QL pair generation system performs logical-form dialogue generation, determines query language and natural language translations of the generated logical-form dialogue, and crowdsources alternative natural language expressions.

In more detail, the NL2QL pair generation system can use a logical-form specification to represent database operations and corresponding arguments based on one or more of the foregoing system inputs. According to the logical-form specification, the NL2QL pair generation system may generate logical-form dialogue based on logical-form rules. Utilizing the logical-form rules, the NL2QL pair generation system can account for contextual information of a previously generated dialogue turn to generate a logical-form representation of a next dialogue turn. Then, applying a NL2QL template to the logical-form representation of the next dialogue turn, the NL2QL pair generation system can generate a pair of a natural language query and a query language representation (a NL2QL pair). Optionally, crowdsources can subsequently, at the instruction of the NL2QL pair generation system, determine additional or alternative paraphrases of the natural language query for pairing with the query-language representation.

To illustrate, in some embodiments, the NL2QL pair generation system can generate a contextual representation of a prior-generated dialogue sequence for comparison to one or more logical-form rules. The logical-form rules include respective trigger conditions and corresponding logical-form actions that detail construction of a logical-form representation of a subsequent dialogue sequence. Based on the comparison indicating satisfaction of a given trigger condition, the NL2QL pair generation system can perform a logical-form action to generate the logical-form representation of the subsequent dialogue sequence. Further, the NL2QL pair generation system can apply the logical-form representation of the subsequent dialogue sequence to a NL2QL template to correspondingly determine a natural language query and query-language representation. In turn, the NL2QL pair generation system can provide the natural language query and the query-language representation to a query-language-response database.

As just mentioned, in some embodiments, the NL2QL pair generation system utilizes logical-form dialogue generation to generate multi-turn dialogue sequences for a dialogue session. For example, given a prior-generated dialogue sequence, a contextualization model can generate a contextual representation of the prior-generated dialogue sequence (e.g., based on one or more context update rules). Then, utilizing logical-form rules, the NL2QL pair generation system can analyze the contextual representation to determine which logical-form rules are met, specifically which trigger conditions of the logical-form rules are satisfied. In some embodiments, different logical-form rules apply to different predicates, albeit not all may apply to a predicate of the prior-generated dialogue sequence. As an example, a first set of logical-form rules applies to an inquire-object predicate for retrieving property values of one or multiple instances, a second set of logical-form rules applies to a retrieve-object predicate for retrieving instances that satisfy a Boolean expression, and a third set of logical-form rules applies to a compute predicate for retrieving objects that satisfy a Boolean expression and performing a computational step. For those logical-form rules whose trigger conditions are satisfied, the NL2QL pair generation system uses corresponding logical-form actions to generate applicable logical-form representations of a subsequent dialogue sequence.

With the logical-form representation of the subsequent dialogue sequence generated, the NL2QL pair generation system can then use a NL2QL template to correspondingly generate a natural language query and a query-language representation of the subsequent dialogue sequence. For example, for an applicable predicate of the subsequent dialogue sequence, the NL2QL pair generation system can generate both a natural language query and a query-language representation by using the NL2QL template. Specifically, the NL2QL template comprises predetermined language in combination with functions configured for converting logical-form arguments of the logical-form representation into corresponding natural language or query language expressions.

After generating the natural language query and the query-language representation of the subsequent dialogue sequence (i.e., the NL2QL pair), the NL2QL pair generation system can perform a variety of operations which culminate in providing the NL2QL pair to a NL2QL pair database. For example, in some embodiments, the NL2QL pair generation system can instruct a third-party server (e.g., a crowdsourcing server, such as Amazon Mechanical Turk) to generate additional or alternative natural language expressions comprising different (and in some cases, more typical or natural) phrasing or verbiage of the natural language query. Further, in some embodiments, the NL2QL pair generation system may execute the query-language representation to generate a response to the subsequent dialogue sequence (e.g., in the form of answer instances or an answer entity retrieved from the input domain database). In turn, the NL2QL pair generation system can provide the generated response and/or the logical-form representation of the subsequent dialogue sequence to the contextualization model as a context update to iterate the foregoing processes. In so doing, the NL2QL pair generation system can generate multi-turn dialogue sequences for storing in the NL2QL pair database as a combined dialogue session.

The NL2QL pair generation system provides several advantages over conventional data generation systems. As one example, the NL2QL pair generation system is domain-independent. That is, the NL2QL pair generation system can generate NL2QL pairs for a wide variety of different software domains given a corresponding input ontology, database, and lexicon. Due to such domain-independence, the NL2QL pair generation system is highly transferrable across different software domains, thereby facilitating increased levels of scaling training data for, in turn, more sophisticated and robust machine-learning models. For example, by utilizing a logical-form specification and associated logical-form rules, the NL2QL pair generation system can, in a domain-independent manner, represent domain database operations and corresponding arguments based on one or more of the domain inputs of an ontology, domain database, and a lexicon.

In addition, the NL2QL pair generation system can generate NL2QL pairs with increased accuracy. For example, by redirecting user input requirements to focus on an input ontology, for instance (as opposed to labelling, annotation, query modification, query formulation, etc.), the NL2QL pair generation system largely removes errors, subjectivity, and inconsistencies from user inputs typical of conventional training data sets. At the same time, by redirecting user inputs to focus on providing the input ontology (e.g., as described more below in relation to at least FIG. 2), the NL2QL pair generation system simplifies and/or reduces user inputs relative to conventional labelling, annotation, query modification, query formulation, etc.

Further, the NL2QL pair generation system utilizes a more flexible model architecture relative to conventional data generation systems. For example, the NL2QL pair generation system can, according to the logical-form dialogue generation disclosed herein, generate multiple dialogue sequences that are based one another in a coherent, singular dialogue session. Additionally, the contextualization model of the NL2QL pair generation system allows for the NL2QL pair generation system to generate a wide variety of unscripted, context-driven dialogue sequences. Further, the architecture of the NL2QL pair generation system reduces a training process complexity by avoiding multiple user feedback loops and/or multiple re-training steps unlike conventional data generation systems. These and other advantages of the NL2QL pair generation system in turn lend to improved NL2QL machine-learning models due to being trained on enhanced training data comprising NL2QL pairs generated via logical-form dialogue construction.

As illustrated by the foregoing discussion, the present disclosure utilizes a variety of terms to describe features and benefits of the NL2QL pair generation system. Additional detail is now provided regarding the meaning of these terms. For example, as used herein, the term "dialogue sequence" refers to textual (e.g., alphanumeric) data corresponding to a query. In particular, a dialogue sequence can include one or more words of a query that do not necessarily form a sentence, but instead form a representation of a query comprising a sentence fragment, query arguments, and/or a description of a particular object or predicate. In some embodiments, a dialogue sequence comprises a prior-generated dialogue sequence (i.e., a dialogue sequence previously generated, for example, according to logical-form dialogue generation as disclosed herein), a subsequent dialogue sequence (i.e., a next dialogue sequence), or an initial dialogue sequence (i.e., a first dialogue sequence). Further, in some embodiments, a dialogue sequence comprises a logical-form representation of a query (e.g., 'Retrieve-Object(Employee, hire_year>=2011),' meaning which employee(s) joined in 2011 or later?). Such a logical-form representation can also be depicted in a table format (as in FIGS. 3A-3C) for ease of discussion.

As used herein, the term "logical-form representation" refers to a specific form or state of a query. In particular, a logical-form representation can include a predicate and one or more predicate arguments of a dialogue sequence. For example, a logical-form representation of a dialog sequence can comprise the following form: Predicate(Predicate Argument 1, . . . , Predicate Argument n). In some embodiments, the term "predicate" refers to subject matter and/or the nature of a query. For example, an inquire-property predicate is a predicate relating to retrieval of property values of one or more instances (e.g., Inquire-Property(Employee, {_id32}, has_office.floor), where the predicate is Inquire-Property, 'Employee' is a question entity, '{_id32}' is a question instance of the 'Employee' entity, and 'floor' is a property in a question path of 'has_office.floor', which all combined means what is the floor of the office of Employee {_id32}?). Further, in some embodiments, a form or state of the logical-form representation comprises a "contextual representation." For instance, a contextual representation can include one or more aspects of a logical-form representation of a prior-generated dialogue sequence. In some implementations, the contextual representation further adds, relative to the logical-form representation of the prior-generated dialogue sequence, contextual predicate arguments (e.g., answer instances, an answer entity, etc.).

Relatedly, the term "predicate argument" refers to an element of a predicate. In particular, predicate arguments can include question instance(s), a question entity, and/or a question path. A "question instance" refers to instances mentioned in a question, or more specifically, in a portion of the logical-form representation. For example, question instance(s) may comprise a set of instance identification values (e.g., '{_id32}' in the foregoing example). Similarly, a "question entity" refers to an entity type of one or more question instances. For example, a question entity may comprise an entity value in the logical-form representation (e.g., 'Employee' in the foregoing example). Further, a "question path" refers to a sequence of relations starting from the question entity and ending with a property in the form of ('rel_1.rel_2 . . . rel_n.property'). In the foregoing example, 'has_office.floor' is the question path, where 'has_office' defines the relationship between 'Employee' and the property 'floor.'

In some embodiments, different predicates comprise additional or alternative predicate arguments, for example, as will be discussed further below in relation to at least FIG. 3A and the logical-form specification. For instance, continuing with the foregoing example of the inquire-property predicate, the inquire property predicate in some embodiments comprises predicate arguments of an 'anchor entity' as a question entity (e.g., a target entity), 'anchor instance(s)' as question instances (e.g., target instances), and 'inference path' as a question path (e.g., a sequence of relations starting from the anchor entity and ending with a property in the form of ('rel_1.rel_2 . . . rel_n.property').

Further, in relation to a contextual representation, predicate arguments can be referred to as "contextual predicate arguments" and may further comprise answer instance(s) and/or an answer entity. An "answer instance" refers to instances mentioned in a response to an executed query. More specifically, an answer instance of a contextual representation in some embodiments is based on a query-language representation executed against a domain database (e.g., as described more below in relation to FIGS. 3A-3C). For example, answer instance(s) may comprise a set of instance identification values (e.g., '{floorID_05}' as a floor number in relation to the foregoing example query what is the floor of the office of Employee {_id32}?). Similarly, an "answer entity" refers to an entity type of one or more answer instances. For example, an answer entity may comprise an entity value in a contextual representation (e.g., 'office' in relation to the foregoing example query).

As also used herein, the term "logical-form rules" refers to a set of computer-executable instructions. In particular, logical-form rules can include computer-executable instructions for comparing values and/or generating a subsequent dialogue sequence. In some embodiments, for example, logical-form rules comprise respective trigger conditions (i.e., threshold values or requisite values) for comparison with a contextual representation. In addition, the logical-form rules may further comprise corresponding logical-form actions (i.e., logical-form dialogue generation instructions) that the NL2QL pair generation system executes if a given trigger condition is satisfied.

Additionally, the term "natural language query" refers to a query expressed in a spoken language without any special syntax or format. For example, a natural language query may include one or more words that form one or more sentences in the form of statements and/or questions. Relatedly, the term "crowdsourced expressions" refers to refined, paraphrased, or otherwise modified natural language queries as output by the NL2QL pair generation system. For example, in some embodiments, crowdsourced expressions may comprise additional or alternative expressions of the natural language query.

As further used herein, the term "query-language representation" refers to a computer programming language (e.g., for requesting and/or retrieving data from a database). For example, a query-language representation may include an SQL expression, a SPARQL expression, or other suitable computer programming language expression.

As also used herein, the term "NL2QL template" refers to a data conversion template. In particular, a NL2QL template can include a template for converting a logical-form representation of a dialogue sequence into a natural language query and/or query-language representation, for example, as described in more detail below in relation to FIG. 3C. Upon generating the natural language query and the query-language representation as a NL2QL pair, the NL2QL pair generation system can provide the NL2QL pair to a NL2QL pair database (i.e., a storage unit, memory device, etc. for storing NL2QL pairs as training data).

The term "NL2QL machine-learning model" as used herein refers to a model that can be tuned (e.g., learn parameters) based on inputs to approximate unknown functions for converting between natural language queries and query language (and/or vice versa). In particular, the term NL2QL machine-learning model can include one or more machine learning algorithms. In these or other embodiments, the NL2QL machine-learning model comprises a neural network. To illustrate, a neural network can include a convolutional neural network, a recurrent neural network, a generative adversarial neural network, a graph neural network, etc.

In learning parameters for the NL2QL machine-learning model based on the NL2QL pairs generated as disclosed herein, a corresponding system can update one or more parameters such as NL2QL conversion parameters of the NL2QL machine-learning model. In particular, the NL2QL pair generation system can utilize a "loss" (e.g., a loss output that, when output from a loss function, represents the difference between a query-language representation as a predicted attribute and a ground truth attribute) to update parameters and more accurately predict attributes corresponding to query-language representations. Examples of loss functions to generate the loss can include a regression loss function (e.g., a mean square error function, a quadratic loss function, an L2 loss function, a mean absolute error/L1 loss function, mean bias error, etc.). Additionally or alternatively, the loss function can include a classification-type loss function (e.g., a hinge loss/multi-class SVM loss function, cross entropy loss/negative log likelihood function, etc.). Further, in some embodiments, the NL2QL machine-learning model comprises a seq2seq model as described in Catherine Finegan-Dollak, Jonathan K. Kummerfeld, Li Zhang, Karthik Ramanathan, Sesh Sadasivam, Rui Zhang, and Dragomir Radev, *Improving Text-To-SQL Evaluation Methodology*, in Proceedings Of The 56th Annual Meeting Of The Association For Computational Linguistics (July 2018) (Volume 1: Long Papers) (pp. 351-360), hereby incorporated by reference in its entirety.

Additional detail will now be provided regarding the NL2QL Pair Generation System in relation to illustrative figures portraying example embodiments and implementations. For example, FIG. 1 illustrates a computing system environment (or "environment") 100 for implementing a NL2QL pair generation system 106 in accordance with one or more embodiments. As shown in FIG. 1, the environment 100 includes server(s) 102, a client device 108, a third-party server 112, and a network 114. Each of the components of the environment 100 can communicate via the network 114, and the network 114 may be any suitable network over which computing devices can communicate. Example networks are discussed in more detail below in relation to FIG. 8.

As shown in FIG. 1, the environment 100 includes the client device 108. The client device 108 can be one of a variety of computing devices, including a smartphone, tablet, smart television, desktop computer, laptop computer, virtual reality device, augmented reality device, or other computing device as described in relation to FIG. 8. Although FIG. 1 illustrates a single client device 108, in some embodiments the environment 100 can include multiple client devices 108. The client device 108 can further communicate with the server(s) 102 via the network 114. For example, the client device 108 can receive user input and provide information pertaining to the user input (e.g., that relates to an ontology, domain database, and/or lexicon) to the server(s) 102.

As shown, the client device 108 includes a corresponding client application 110. In particular, the client application 110 may be a web application, a native application installed on the client device 108 (e.g., a mobile application, a desktop application, etc.), or a cloud-based application where part of the functionality is performed by the server(s) 102. The client application 110 can present or display information to a user associated with the client device 108, including information that is responsive to one or more user inputs comprising an ontology, domain database, and/or lexicon (e.g., a NL2QL pair). In addition, the user can interact with the client application 110 to provide user input to, for example, access a NL2QL pair database or provide the NL2QL pair database to a machine-learning model (e.g., for training purposes).

As mentioned, the environment 100 includes the third-party server 112. The third-party server 112 can include a variety of computing devices as described in relation to FIG. 8. The third-party server 112 can generate and/or provide additional or alternative natural language query expressions. In some embodiments, the third-party server 112 is a crowdsourcing server. In these or other embodiments, the NL2QL pair generation system 106 can provide a generated natural language query to the third-party server 112 for performing various operations (e.g., to refine, paraphrase, generate additional or alternative natural language query expressions, etc.). Although FIG. 1 illustrates a single third-party server 112, in some embodiments the environment 100 can include multiple different third-party servers 112. In addition, the third-party server 112 can communicate with the server(s) 102 via the network 114 or multiple client devices.

As illustrated in FIG. 1, the environment 100 includes the server(s) 102. In some embodiments, the server(s) 102 comprises a content server and/or a data collection server. The server(s) 102 can also comprise an application server, a communication server, a web-hosting server, a social networking server, or a digital content management server. In particular, the server(s) 102 may learn, generate, store, receive, and transmit electronic data, such as executable instructions for performing logical-form dialogue generation, converting a logical-form representation to a corresponding natural language query and query-language representation, providing a natural language query to the third-party server 112 for crowdsourcing additional or alternative natural language query expressions, and/or providing NL2QL pairs to a NL2QL pair database. For example, the server(s) 102 may receive data from the client device 108 based on user input to provide an input ontology, domain database, and/or lexicon. In turn, the server(s) 102 can transmit data to one or more components in the environment 100. For example, the server(s) 102 can provide access to a NL2QL pair database to the client device 108. Similarly, for example, the server(s) 102 may receive data from the third-party server 112 regarding one or more crowdsourced expressions of a natural language query. In turn, the server(s) 102 can transmit the crowdsourced expressions to the NL2QL pair generation system for pairing with a corresponding natural language query and query language representation. These and other example communications between the server(s) 102 and other components of the environment 100 are herein contemplated.

Although FIG. 1 depicts the NL2QL pair generation system 106 located on the server(s) 102, in some embodiments, the NL2QL pair generation system 106 may be implemented by one or more other components of the environment 100 (e.g., by being located entirely or in part at one or more of the other components). For example, the NL2QL pair generation system 106 may be implemented by the client device 108, the third-party server 112, and/or another suitable device.

As shown in FIG. 1, the NL2QL pair generation system 106 is implemented as part of a digital content management system 104 located on the server(s) 102. The digital content management system 104 can organize, manage, and/or execute handling of logical-form dialogue generation and/or NL2QL pairs generated therefrom. For example, the digital content management system 104 can identify various aspects of an input ontology, domain database, lexicon, etc. and direct the NL2QL pair generation system 106 to generate NL2QL pairs for storing in a NL2QL pair database accordingly. The digital content management system 104 can also send data (e.g., NL2QL pairs) from the NL2QL pair database to one or more components of the environment 100 via the network 114 for training a NL2QL machine-learning model.

In some embodiments, though not illustrated in FIG. 1, the environment 100 may have a different arrangement of components and/or may have a different number or set of components altogether. For example, the client device 108 and/or the third-party server 112 may communicate directly with the NL2QL pair generation system 106, bypassing the network 114.

Figure 2:
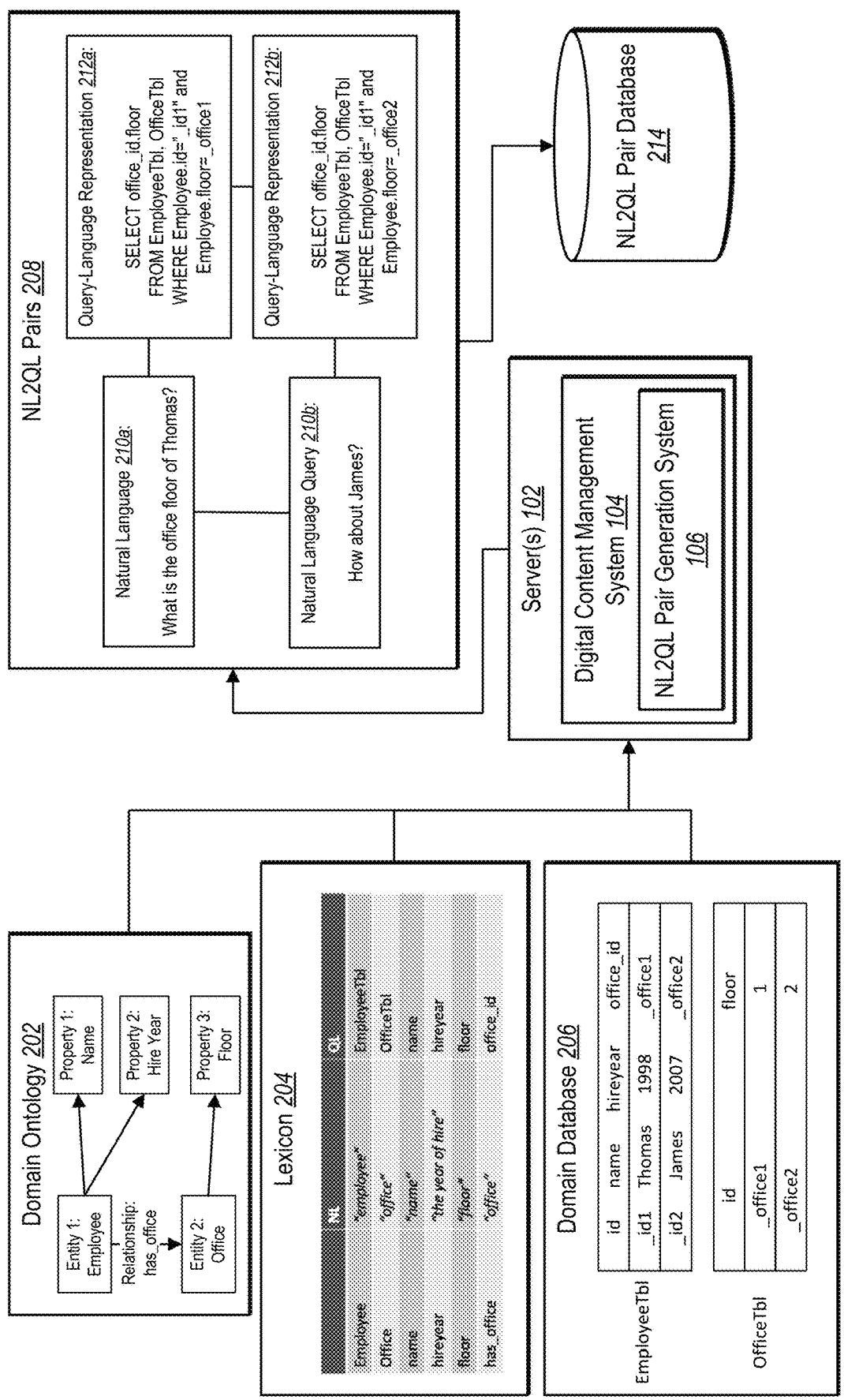
FIG. 2 illustrates a schematic diagram of a NL2QL pair generation system generating NL2QL pairs in accordance with one or more embodiments.

As mentioned above, the NL2QL pair generation system can generate NL2QL pairs for a wide variety of different software domains given a corresponding input ontology, database, and lexicon. In so doing, the NL2QL pair generation system can establish domain-independence for cross-application in training various machine-learning models based on many different software domains. FIG. 2 illustrates the NL2QL pair generation system 106 utilizing a domain ontology 202, a lexicon 204, and a domain database 206 to generate NL2QL pairs 208 in accordance with one or more embodiments of the present disclosure. Based on the NL2QL pairs 208, the NL2QL pair generation system 106 can provide the NL2QL pairs 208 to a NL2QL pair database 214.

As shown in FIG. 2, one of the inputs to the NL2QL pair generation system 106 comprises the domain ontology 202. In some embodiments, the domain ontology 202 represents a schema of the domain database 206. In particular, the domain ontology 202 can include entities, corresponding properties, and entity relationships. For example, and as illustrated in FIG. 2, a first entity ('Employee') may correspond to two properties, 'name' and 'hire year.' Likewise, for instance, a second entity ('Office') may correspond to a third property, 'floor.' In this example, the entity relationship between the first entity and the second entity comprises 'has_office,' where an entity relationship can include 1:N mappings between entities.

In these or other embodiments, an entity may correspond to an umbrella concept, as included in the domain database 206. For example, an entity, such as 'Employee,' may correspond to a table in a relational database (e.g., 'EmployeeTbl' as shown in the domain database 206) or a node in a graph-based database. Further, an entity can possess one or more properties. In some embodiments, a property, such as 'hire year,' may correspond to a column or row in a relational database (e.g., 'hireyear' as shown in the domain database 206) or a node in a graph-based database. Additionally, in some implementations, an entity relationship like 'has_office' in a relational database corresponds to either a column/row (1:1 or 1:N mappings) or another table (N:N mappings). Alternatively, an entity relationship in a graph-based database can correspond to an edge.

FIG. 2 further illustrates the lexicon 204 comprising data indicating how various elements of the domain ontology 202 and the domain database 206 map to natural language expressions (denoted as "NL") and query language expressions (denoted as "QL"). In particular, the lexicon 204 comprises data indicating how each of the entities, properties and relations (described above) map to natural language expressions and query language expressions. Additionally, in some embodiments, the NL2QL pair generation system 106 uses the lexicon 204 when translating a logical-form representation into a corresponding natural language query and query-language representation, as will be described in more detail in relation to FIG. 3C. Further, albeit omitted for brevity and clarity of illustration, the lexicon 204 in some embodiments comprises a conversion definition for IDs (e.g., Thomas for _id1), which is assumed present for one or more entities.

Further shown in FIG. 2, the domain database 206 represents information regarding a software program, such as an application. In many cases, the domain database 206 is pre-defined or already available (e.g., existing from application design/build). In particular, the domain database 206 for a software application can include requirements, computer-executable instructions, terminology, functionality, program elements, parameters, stored/tracked data, etc. from which data can be used to respond to queries regarding the software application, for example, as performed by NL2QL machine-learning models. In some embodiments, the domain database 206 comprises data stored in or represented via query language. Thus, in order to train a NL2QL machine-learning model to respond to natural language questions pertaining to query language content in the domain database 206, the NL2QL pair generation system 106 utilizes logical-form dialogue generation based on the domain ontology 202, the lexicon 204, and/or the domain database 206 as described in more detail below in relation to FIGS. 3A-3C.

In turn, the NL2QL pair generation system 106 can convert logical-form dialogue representations of dialogue sequences to output the NL2QL pairs 208 shown in FIG. 2. For example, the NL2QL pair generation system 106 can generate a first NL2QL pair comprising a natural language query 210a and a query-language representation 212a based on a first logical-form dialogue sequence. Likewise, the NL2QL pair generation system 106 can generate a second NL2QL pair comprising a natural language query 210b and a query-language representation 212b based on a second logical-form dialogue sequence. In these or other embodiments, the natural language query 210b and the query-language representation 212b are based on the previous natural language query 210a and a query-language representation 212a. That is, the NL2QL pairs 208 represent a single dialogue session of multiple, related dialogue sequences.

In turn, the NL2QL pair generation system 106 can provide the NL2QL pairs 208 to the NL2QL pair database 214. In these or other embodiments, the NL2QL pair database 214 represents a storage unit, memory device, etc. for storing the NL2QL pairs 208 as training data (e.g., to train a NL2QL machine-learning model).

As mentioned above, the NL2QL pair generation system 106 can use the domain ontology 202, the lexicon 204, and/or the domain database 206 to perform logical-form dialogue generation. In so doing, the NL2QL pair generation system 106 can create NL2QL pairs for unscripted, context-driven dialogue sequences and in a manner applicable for a wide variety of software domains. FIG. 3A illustrates the NL2QL pair generation system 106 utilizing a domain ontology 302, a lexicon 304, and a domain database 306 to generate a logical-form representation 316 in accordance with one or more embodiments. The domain ontology 302, the lexicon 304, and the domain database 306 may be the same as or similar to the domain ontology 202, the lexicon 204, and the domain database 206 described above in relation to FIG. 2.

Figure 3A:
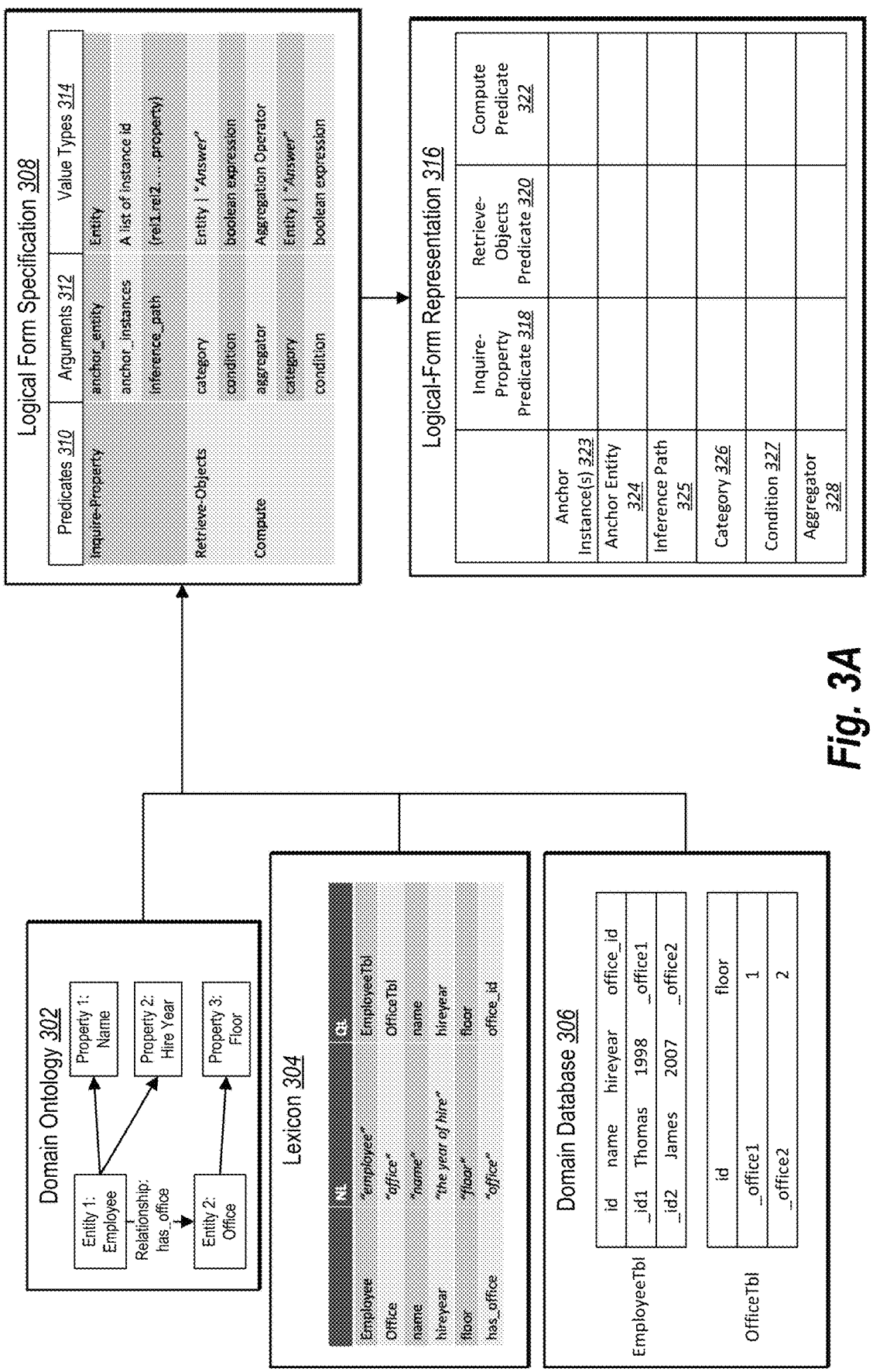
FIG. 3A illustrates a schematic diagram of a NL2QL pair generation system generating a logical-form representation in accordance with one or more embodiments.

As shown in FIG. 3A, the NL2QL pair generation system 106 generates the logical-form representation 316 based on the domain ontology 302, the lexicon 304, and/or the domain database 306 by utilizing a logical-form specification 308. In particular, the logical-form specification 308 comprises predicates 310, arguments 312, and value types 314, each discussed in turn. For example, an inquire-property predicate of the predicates 310 comprises a predicate relating to retrieval (from the domain database 306) of property values of one or more instances. The arguments 312 for the inquire-property predicate comprise an anchor entity, anchor instances, and inference path. The value types 314 corresponding to the respective arguments 312 of the inquire-property predicate comprise: (i) a target entity for one or more question instances (i.e., an 'anchor entity') in a question or dialogue sequence, (ii) targeted question instances (i.e., 'anchor instances') such as a list of instance IDs mentioned in the question or dialogue sequence, and (iii) a sequence of entity relationships from the domain ontology 302 starting from the anchor entity and ending with a property in the form of 'rel_1.rel_2 . . . rel_n.property' (i.e., an 'inference path').

Further, a retrieve-objects predicate of the predicates 310 comprises a predicate relating to the retrieval of instances that satisfy a condition. The arguments 312 for the inquire-property predicate therefore comprise a category and a condition. The category defines a set of the instances among which a search/retrieval is performed in the domain database 306. Accordingly, those of the value types 314 which correspond to the category argument of the retrieve-objects predicate comprise: (i) a name of the target entity for one or more anchor instances mentioned in a query and/or (ii) answer instances returned by executing a query against the domain database 306. With respect to the condition argument of the arguments 312, the value types 314 which correspond thereto comprise a Boolean expression.

In addition to the inquire-property predicate and the retrieve-objects predicate, the predicates 310 further comprises a compute predicate that specifies a computational operation to perform over retrieved objects. Accordingly, the arguments 312 and the value types 314 for the compute predicate are the same as the arguments 312 and the value types 314 for the retrieve-objects predicate, except for the addition of a computational argument to the arguments 312 (denoted as "aggregator," although computational operations beyond aggregation are herein contemplated). A value type from the value types 314 corresponding to the aggregator argument comprises a computational operator, function, and/or equation (denoted as "Aggregation Operator").

Based on the logical-form specification 308 as just described, the NL2QL pair generation system 106 can generate a logical-form representation 316 of one or more dialogue sequences. Such logical-form dialogue generation is described more below in relation to FIG. 3B. However, as a general overview, the logical-form representation 316 can take many forms based on an applicability of a predicate for a given dialogue sequence. For example, one version of the logical-form representation 316 may include predicate arguments corresponding an inquire-property predicate 318. In another version of the logical-form representation 316, predicate arguments may correspond to a retrieve-objects predicate 320. Similarly, in yet another version of the logical-form representation 316, predicate arguments may correspond to a compute predicate 322.

In an example implementation, for instance, the NL2QL pair generation system 106 can construct the logical-form representation 316 as representing the following logical-form dialogue sequence 'Inquire-Property(Employee, {_id32}, has_office.floor),' where the predicate is the inquire-property predicate 318. Specifically, based on the logical-form specification 308, the NL2QL pair generation system 106 can generate corresponding predicate arguments comprising (i) a question entity 'Employee' for an anchor entity 324, (ii) a question instance '{_id32}' for an anchor instance 323 of the 'Employee' entity, and (iii) a question path 'has_office.floor' as an inference path 325, which in combination means what is the floor of the office of Employee {_id32}?.

In another example implementation, for instance, the NL2QL pair generation system 106 can construct the logical-form representation 316 as representing the following logical-form dialogue sequence 'Retrieve-Object(Employee, hire_year>=2011),' where the predicate is the retrieve-objects predicate 320. Specifically, based on the logical-form specification 308, the NL2QL pair generation system 106 can generate corresponding predicate arguments comprising (i) an entity name 'Employee' for a category 326 and (ii) a Boolean expression 'hire_year>=2011' for a condition 327, which in combination means which employee(s) joined in 2011 or later?.

In still another example implementation, for instance, the NL2QL pair generation system 106 can construct the logical-form representation 316 as representing the following logical-form dialogue sequence 'Compute(count, Employee, hire_year>=2011),' where the predicate is the compute predicate 322. Specifically, based on the logical-form specification 308, the NL2QL pair generation system 106 can generate corresponding predicate arguments comprising (i) a 'count' function as an aggregator 328, (ii) an entity name 'Employee' for a category 326, and (iii) a Boolean expression 'hire_year>=2011' for a condition 327, which in combination means how many employee(s) joined in 2011 or later?.

Figure 3B:
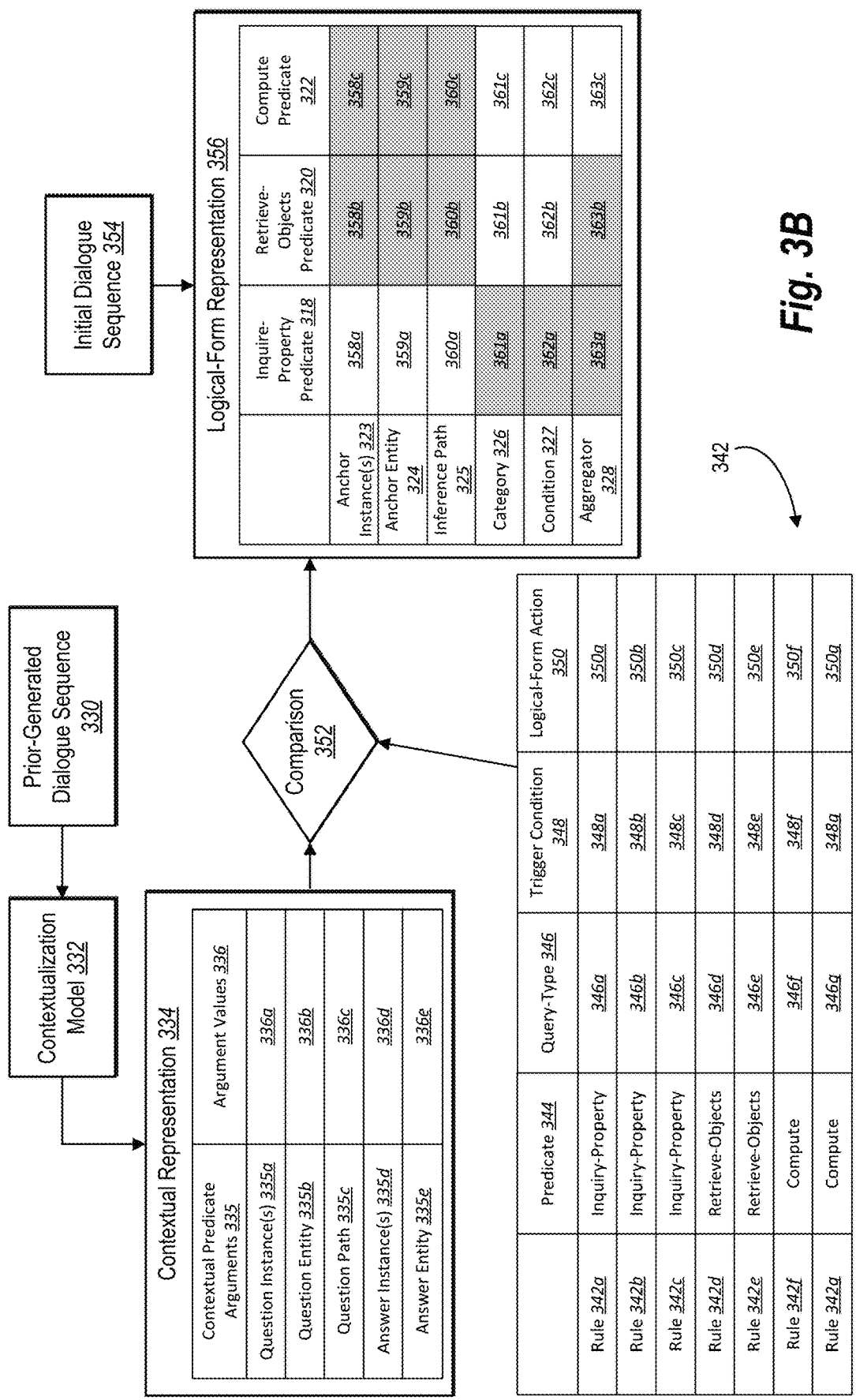
FIG. 3B illustrates a schematic diagram of a NL2QL pair generation system generating a logical-form representation based on logical-form rules in accordance with one or more embodiments.

As just described, the NL2QL pair generation system 106 can use the logical-form specification 308 to perform logical-form dialogue generation based on information from the domain ontology 302, the lexicon 304, and/or the domain database 306. In more detail however, and as mentioned above, the NL2QL pair generation system 106 can utilize logical-form rules to generate a logical-form representation. By using such logical-form rules, the NL2QL pair generation system 106 can intelligently construct logical-form representations that account for prior-generated dialogue sequences. As such, FIG. 3B illustrates the NL2QL pair generation system 106 utilizing a contextualization model 332 and logical-form rules 342 to generate a logical-form representation 356 in accordance with one or more embodiments of the present disclosure. In particular, the NL2QL pair generation system 106 can, via a comparison 352, compare a contextual representation 334 with one or more of the logical-form rules 342.

To generate the contextual representation 334 for comparing with one or more of the logical-form rules 342, the contextualization model 332 applies one or more context update rules to a prior-generated dialogue sequence 330. These context update rules are predicate-specific to the prior-generated dialogue sequence 330. That is, based on the contextual predicate arguments 335 that are applicable to the predicate of the prior-generated dialogue sequence 330, the contextualization model 332 can generate corresponding argument values 336. For example, for an inquire-property predicate, the contextualization model 332 can update question instance(s) 335*a*, question entity 335*b*, and question path 335*c* based on the prior-generated dialogue sequence 330. In particular, the contextualization model 332 can update argument value 336*a* with 'anchor instances', argument value 336*b* with 'anchor entity', and argument value 336*c* with 'inference path'. Additionally, for the inquire-property predicate, the contextualization model 332 can update answer instance(s) 335*d* and answer entity 335*e* based on a query execution against a domain database (e.g., as described more below in relation to FIG. 3C). In particular, the contextualization model 332 can update argument value 336*d* with '[ ]', and argument value 336*e* with 'none', because a response to the prior-generated dialogue sequence 330 with an inquire-property predicate does not include any instances.

As another example, for a retrieve-objects predicate of the prior-generated dialogue sequence 330, the contextualization model 332 can update question instance(s) 335*a*, question entity 335*b*, and question path 335*c* based on the prior-generated dialogue sequence 330. In particular, the contextualization model 332 can update argument value 336*a* with '[ ]', argument value 336*b* with 'category', and argument value 336*c* with 'none', because a retrieve-object predicate for the prior-generated dialogue sequence 330 does not include question instances. Additionally, for the retrieve-objects predicate, the contextualization model 332 can update answer instance(s) 335*d* and answer entity 335*e* based on a query execution of the prior-generated dialogue sequence 330 against a domain database (e.g., as described more below in relation to FIG. 3C). In particular, the contextualization model 332 can update argument value 336*d* with 'answer instances', and argument value 336*e* with 'category'.

As yet another example, for a compute predicate of the prior-generated dialogue sequence 330, the contextualization model 332 can update question instance(s) 335*a*, question entity 335*b*, and question path 335*c* based on the prior-generated dialogue sequence 330. In particular, the contextualization model 332 can update argument value 336*a* with '[ ]', argument value 336*b* with 'category', and argument value 336*c* with 'none', because a compute predicate for the prior-generated dialogue sequence 330 does not include question instances. Additionally, for the compute predicate, the contextualization model 332 can update answer instance(s) 335*d* and answer entity 335*e* based on a query execution of the prior-generated dialogue sequence 330 against a domain database (e.g., as described more below in relation to FIG. 3C). In particular, the contextualization model 332 can update argument value 336*d* with ' [ ]', and argument value 336*e* with 'none', because a response to the prior-generated dialogue sequence 330 with a compute predicate does not include any instances. The foregoing update rules are summarized in Table 1, although additional or alternative context update rules are herein contemplated. For example, the contextualization model 332 may utilize context update rules relating to predicate arguments of 'condition,' 'aggregator,' etc.

TABLE 1

Context Update Rules for Contextual Predicate Arguments (row) by Predicate (col.)

|  | Inquire-Property Predicate | Retrieve-Objects Predicate | Compute Predicate |
| --- | --- | --- | --- |
| Question Instances | Anchor Instances | [ ] | [ ] |
| Question Entity | Anchor Entity | Category | Category |
| Question Path | Path | None | None |
| Answer Instances | [ ] | Answer Instances | [ ] |
| Answer Entity | None | Category | None |

With the contextual representation 334 populated, the NL2QL pair generation system 106 can compare the contextual representation 334 against one or more of the logical-form rules 342 via the comparison 352. In some embodiments, the NL2QL pair generation system 106 compares all of the logical-form rules 342 with the contextual representation 334 via the comparison 352. In turn, the NL2QL pair generation system 106 can generate all possible logical-form representations (i.e., in some cases multiple variations of the logical-form representation 356) given the contextual representation 334. In these or other embodiments, however, the NL2QL pair generation system 106 may select (e.g., randomly select) only one implementation of the logical-form representation 356 for generating a NL2QL pair via a NL2QL template as described more below in relation to FIG. 3C.

According to a first rule 342*a*, the NL2QL pair generation system 106 can generate a subsequent dialogue sequence with a predicate 344 comprising an inquire-property predicate. A corresponding query-type 346*a* for the subsequent dialogue sequence comprises an inquiry regarding different properties, but for a same question entity as included in the argument value 336*b* of the contextual representation 334. Accordingly, a trigger condition 348*a* comprises the argument value 336*b* for the question entity 335*b* being a non-null value. If, via the comparison 352, the NL2QL pair generation system 106 determines the trigger condition 348*a* is satisfied, the NL2QL pair generation system 106 can generate the subsequent dialogue sequence by constructing a portion of the logical-form representation 356 as instructed in the logical-form action 350a.

Specifically, the logical-form action 350a instructs the NL2QL pair generation system 106 to populate (i) a predicate argument value 358a for the anchor instances 323 with the value provided in the argument value 336a of the contextual representation 334, (ii) a predicate argument value 359a for the anchor entity 324 with the value provided in the argument value 336b of the contextual representation 334, and (iii) a predicate argument value 360a for the inference path 325 by randomly selecting a path starting from the predicate argument value 359a for the anchor entity 324 using the input domain ontology (e.g., the domain ontology 202/302 described above). As an example, where the prior-generated dialogue sequence 330 in essence inquires what is the phone number of Richard?, the NL2QL pair generation system 106 may generate a logical-form representation 356 for a subsequent dialogue sequence that in essence inquires what is his office number?. On the other hand, if the NL2QL pair generation system 106 determines the trigger condition 348a is not satisfied via the comparison 352, the NL2QL pair generation system 106 will not apply the logical-form action 350a under the first rule 342a.

According to a second rule 342b, the NL2QL pair generation system 106 can generate a subsequent dialogue sequence with a predicate 344 comprising the inquire-property predicate. A corresponding query-type 346b for the subsequent dialogue sequence comprises an inquiry regarding a same property, but for a different question instance than included in the argument value 336a of the contextual representation 334. Accordingly, a trigger condition 348b comprises the argument value 336c for the question path 335c being a non-null value. If, via the comparison 352, the NL2QL pair generation system 106 determines the trigger condition 348b is satisfied, the NL2QL pair generation system 106 can generate the subsequent dialogue sequence by constructing a portion of the logical-form representation 356 as instructed in the logical-form action 350b.

Specifically, the logical-form action 350b instructs the NL2QL pair generation system 106 to populate (i) a predicate argument value 360a for the inference path 325 with the value provided in the argument value 336c of the contextual representation 334, (ii) a predicate argument value 358a for the anchor instances 323 by randomly selecting one or more instances included in the input domain database (e.g., the domain database 206/306 described above), and (iii) a predicate argument value 359a for the anchor entity 324 by selecting an entity corresponding to the predicate argument value 358a. As an example, where the prior-generated dialogue sequence 330 in essence inquires what is the phone number of Richard?, the NL2QL pair generation system 106 may generate a logical-form representation 356 for a subsequent dialogue sequence that in essence inquires what about for Amy?. On the other hand, if the NL2QL pair generation system 106 determines the trigger condition 348b is not satisfied via the comparison 352, the NL2QL pair generation system 106 will not apply the logical-form action 350b under the second rule 342b.

According to a third rule 342c, the NL2QL pair generation system 106 can generate a subsequent dialogue sequence with a predicate 344 comprising the inquire-property predicate. A corresponding query-type 346c for the subsequent dialogue sequence comprises an inquiry regarding one or more properties of answer instances in the argument value 336d of the contextual representation 334. Accordingly, a trigger condition 348c comprises the argument value 336d for the answer instances 335d being a non-null value. If, via the comparison 352, the NL2QL pair generation system 106 determines the trigger condition 348c is satisfied, the NL2QL pair generation system 106 can generate the subsequent dialogue sequence by constructing a portion of the logical-form representation 356 as instructed in the logical-form action 350c.

Specifically, the logical-form action 350c instructs the NL2QL pair generation system 106 to populate (i) a predicate argument value 358a for the anchor instances 323 with the value provided in the argument value 336d of the contextual representation 334, (ii) a predicate argument value 359a for the anchor entity 324 with the value provided in the argument value 336e of the contextual representation 334, and (iii) a predicate argument value 360a for the inference path 325 by randomly selecting a path starting from the predicate argument value 359a for the anchor entity 324 using the input domain ontology (e.g., the domain ontology 202/302 described above). As an example, where the prior-generated dialogue sequence 330 in essence inquires what employees joined in 2019?, and a response thereto includes in essence that Richard and Amy joined in 2019, the NL2QL pair generation system 106 may generate a logical-form representation 356 for a subsequent dialogue sequence that in essence inquires what are their phone numbers?. On the other hand, if the NL2QL pair generation system 106 determines the trigger condition 348c is not satisfied via the comparison 352, the NL2QL pair generation system 106 will not apply the logical-form action 350c under the third rule 342c.

According to a fourth rule 342d, the NL2QL pair generation system 106 can generate a subsequent dialogue sequence with a predicate 344 comprising the retrieve-objects predicate. A corresponding query-type 346d for the subsequent dialogue sequence comprises an inquiry regarding a retrieval of instances from among answer instances in the argument value 336d of the contextual representation 334 that satisfy a condition. Accordingly, a trigger condition 348d comprises the argument value 336d for the answer instance(s) 335d including two or more instances. If, via the comparison 352, the NL2QL pair generation system 106 determines the trigger condition 348d is satisfied, the NL2QL pair generation system 106 can generate the subsequent dialogue sequence by constructing a portion of the logical-form representation 356 as instructed in the logical-form action 350d.

Specifically, the logical-form action 350d instructs the NL2QL pair generation system 106 to populate (i) a predicate argument value 361b for the category 326 with the answer instances returned in the argument value 336d of the contextual representation 334 and (ii) a predicate argument value 362b for the condition 327 by randomly selecting a property (e.g., from the domain ontology 202/302 described above), a comparison operator, and a threshold value. As an example, where the prior-generated dialogue sequence 330 in essence inquires what employees work in Building A?, and a response thereto includes in essence that Richard and Amy work in Building A, the NL2QL pair generation system 106 may generate a logical-form representation 356 for a subsequent dialogue sequence that in essence inquires among them, who joined in 2019?. On the other hand, if the NL2QL pair generation system 106 determines the trigger condition 348d is not satisfied via the comparison 352, the NL2QL pair generation system 106 will not apply the logical-form action 350d under the fourth rule 342d.

According to a fifth rule 342e, the NL2QL pair generation system 106 can generate a subsequent dialogue sequence with a predicate 344 comprising the retrieve-objects predicate. A corresponding query-type 346e for the subsequent dialogue sequence comprises an inquiry regarding a retrieval of instances from among those of a question entity in the argument value 336b of the contextual representation 334 that satisfies a condition. Accordingly, a trigger condition 348e comprises the argument value 336b for the question entity 335b being a non-null value. If, via the comparison 352, the NL2QL pair generation system 106 determines the trigger condition 348e is satisfied, the NL2QL pair generation system 106 can generate the subsequent dialogue sequence by constructing a portion of the logical-form representation 356 as instructed in the logical-form action 350e.

Specifically, the logical-form action 350e instructs the NL2QL pair generation system 106 to populate (i) a predicate argument value 361b for the category 326 with the question entity returned in the argument value 336b of the contextual representation 334 and (ii) a predicate argument value 362b for the condition 327 by randomly selecting a property (e.g., from the domain ontology 202/302 described above), a comparison operator, and a threshold value. As an example, where the prior-generated dialogue sequence 330 in essence inquires which employees joined in 2019?, the NL2QL pair generation system 106 may generate a logical-form representation 356 for a subsequent dialogue sequence that in essence inquires how about the ones joined in 2018?. On the other hand, if the NL2QL pair generation system 106 determines the trigger condition 348e is not satisfied via the comparison 352, the NL2QL pair generation system 106 will not apply the logical-form action 350e under the fifth rule 342e.

According to a sixth rule 342f, the NL2QL pair generation system 106 can generate a subsequent dialogue sequence with a predicate 344 comprising the compute predicate. A corresponding query-type 346f for the subsequent dialogue sequence comprises an inquiry regarding a computation of instances retrieved from among answer instances in the argument value 336d of the contextual representation 334 that satisfy a condition. Accordingly, a trigger condition 348f comprises the argument value 336d for the answer instance(s) 335d including two or more instances. If, via the comparison 352, the NL2QL pair generation system 106 determines the trigger condition 348f is satisfied, the NL2QL pair generation system 106 can generate the subsequent dialogue sequence by constructing a portion of the logical-form representation 356 as instructed in the logical-form action 350f.

Specifically, the logical-form action 350f instructs the NL2QL pair generation system 106 to populate (i) a predicate argument value 361b for the category 326 with the answer instances returned in the argument value 336d of the contextual representation 334, (ii) a predicate argument value 362b for the condition 327 by randomly selecting a property (e.g., from the domain ontology 202/302 described above), a comparison operator, and a threshold value, and (iii) a predicate argument value 363c for the aggregator 328 by randomly selecting a computational operator, function, and/or equation. As an example, where the prior-generated dialogue sequence 330 in essence inquires what employees work in Building A?, and a response thereto includes in essence that Richard and Amy work in Building A, the NL2QL pair generation system 106 may generate a logical-form representation 356 for a subsequent dialogue sequence that in essence inquires among them, how many joined in 2019?. On the other hand, if the NL2QL pair generation system 106 determines the trigger condition 348f is not satisfied via the comparison 352, the NL2QL pair generation system 106 will not apply the logical-form action 350f under the sixth rule 342f.

According to a seventh rule 342g, the NL2QL pair generation system 106 can generate a subsequent dialogue sequence with a predicate 344 comprising the compute predicate. A corresponding query-type 346g for the subsequent dialogue sequence comprises an inquiry regarding a computation of instances retrieved from among those of a question entity in the argument value 336b of the contextual representation 334 that satisfies a condition. Accordingly, a trigger condition 348g comprises the argument value 336b for the question entity 335b being a non-null value. If, via the comparison 352, the NL2QL pair generation system 106 determines the trigger condition 348g is satisfied, the NL2QL pair generation system 106 can generate the subsequent dialogue sequence by constructing a portion of the logical-form representation 356 as instructed in the logical-form action 350g.

Specifically, the logical-form action 350g instructs the NL2QL pair generation system 106 to populate (i) a predicate argument value 361b for the category 326 with the question entity returned in the argument value 336b of the contextual representation 334, (ii) a predicate argument value 362b for the condition 327 by randomly selecting a property (e.g., from the domain ontology 202/302 described above), a comparison operator, and a threshold value, and (iii) a predicate argument value 363c for the aggregator 328 by randomly selecting a computational operator, function, and/or equation. As an example, where the prior-generated dialogue sequence 330 in essence inquires which employees joined in 2019?, the NL2QL pair generation system 106 may generate a logical-form representation 356 for a subsequent dialogue sequence that in essence inquires how many joined in 2018?. On the other hand, if the NL2QL pair generation system 106 determines the trigger condition 348g is not satisfied via the comparison 352, the NL2QL pair generation system 106 will not apply the logical-form action 350g under the seventh rule 342g.

Further illustrated in the logical-form representation 356, some of the predicate argument values are greyed out to indicate an inapplicability of a predicate argument for a corresponding predicate. For example, the inquire-property predicate 318 does not include the predicate arguments of the category 326, the condition 327, or the aggregator 328. Therefore, predicate argument values 361a, 362a, and 363a are grayed out. Similarly, the retrieve-objects predicate 320 does not include the predicate arguments of the anchor instances 323, the anchor entity 324, the inference path 325, or the aggregator 328. Therefore, the predicate argument values 358b, 359b, 360b, and 363b are greyed out. Further, the compute predicate 322 does not include the predicate arguments of the anchor instances 323, the anchor entity 324, or the inference path 325. Therefore, the predicate argument values 358c, 359c, and 360c are greyed out.

As further shown in FIG. 3B, in some embodiments, the NL2QL pair generation system 106 can generate a logical-form representation 356 without the logical-form rules 342. For example, for an initial dialogue sequence 354, the NL2QL pair generation system 106 can randomly select the predicate (e.g., the inquire-property predicate 318, the retrieve-objects predicate 320, or the compute predicate 322) and corresponding predicate arguments 323-328 and values thereof. That is, for the initial dialogue sequence 354, there is no prior-generated dialogue sequence for the contextualization model 332 to determine a contextual representation of for comparison with the logical-form rules 342.

Thus, in some embodiments, the logical-form rules 342 only apply if there is a contextual representation 334 of a prior-generated dialogue sequence 330. Further, in some embodiments, the initial dialogue sequence 354 becomes the prior-generated dialogue sequence 330. For example, in generating a subsequent dialogue sequence (i.e., a second dialogue sequence) that immediately follows the initial dialogue sequence 354, the NL2QL pair generation system 106 can then consider the initial dialogue sequence 354 as the prior-generated dialogue sequence 330 and proceed in the manner as just described to generate a subsequent dialogue sequence.

Figure 3C:
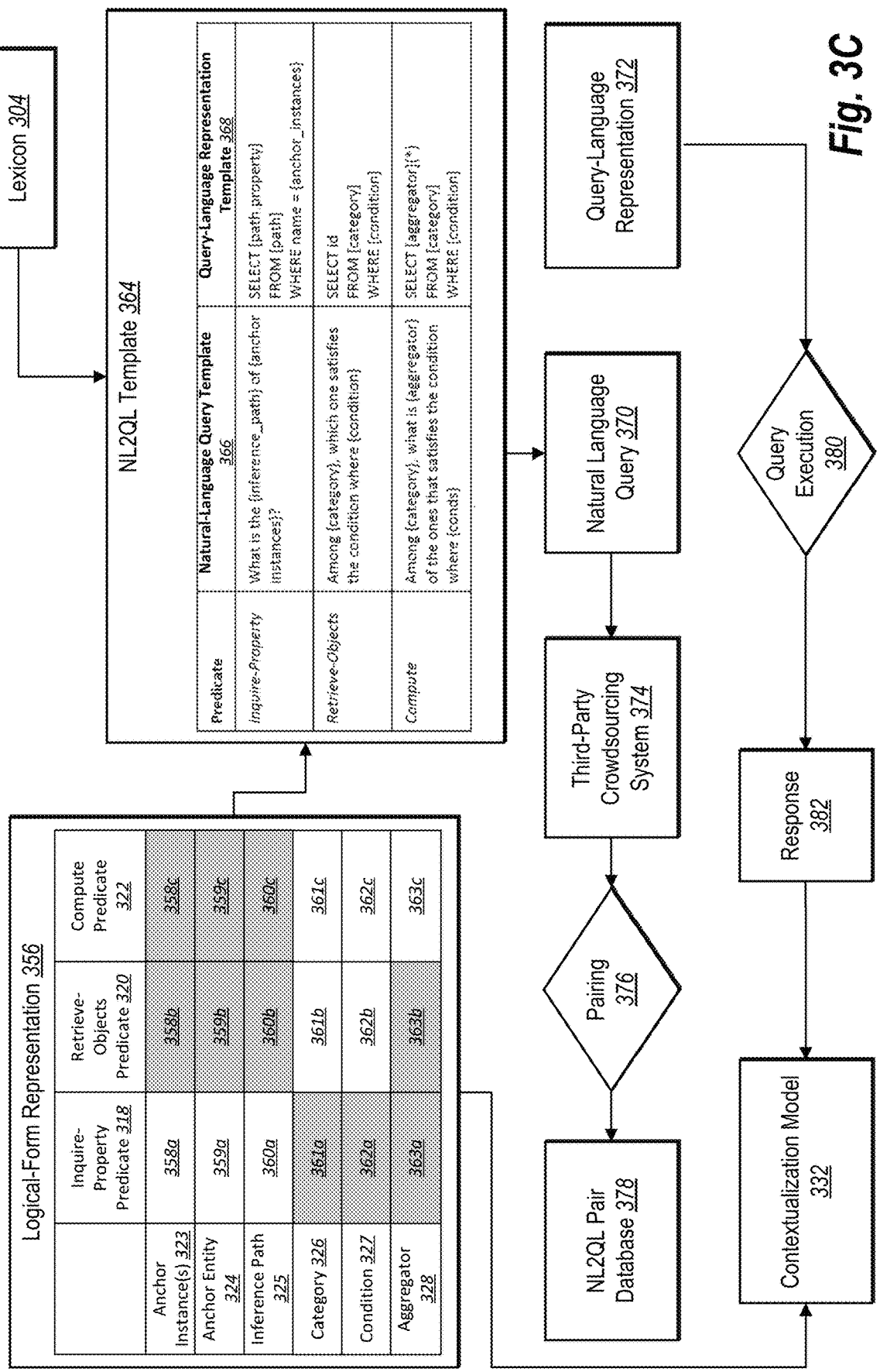
FIG. 3C illustrates a schematic diagram of a NL2QL pair generation system utilizing a NL2QL template to generate a natural language query and a query-language representation in accordance with one or more embodiments.

As just described, the NL2QL pair generation system 106 can utilize logical-form rules to generate a logical-form representation. By using such logical-form rules, the NL2QL pair generation system 106 can intelligently construct logical-form representations that account for prior-generated dialogue sequences. Then, via a NL2QL template, the NL2QL pair generation system 106 can convert a logical-form representation into a NL2QL pair for use in learning parameters of a NL2QL machine-learning model. As such, FIG. 3C illustrates the NL2QL pair generation system 106 utilizing a NL2QL template 364 to generate a natural language query 370 and a query-language representation 372 in accordance with one or more embodiments of the present disclosure. In turn, the NL2QL pair generation system 106 can provide the natural language query 370 and the query-language representation 372 to a NL2QL pair database 378, in addition to performing various operations in some embodiments described below.

As shown, the NL2QL template 364 comprises a natural language query template 366 and a query-language representation template 368 for generating the natural language query 370 and the query-language representation 372, respectively. In particular, the natural language query template 366 and the query-language representation template 368 comprise various functions for converting logical-form arguments of the logical-form representation 356 into corresponding natural language or query language expressions. For example, these functions, denoted by braces "{ }" or brackets "[ ]", call or pass specific predicate arguments from the logical-form representation 356 to apply the corresponding values thereof in the NL2QL template 364. Then, utilizing the lexicon 304 described above, the NL2QL pair generation system 106 can convert aspects of the predicate argument values to appropriate terms in natural language or query language.

For instance, two functions in the first template of the natural language query template 366 for the inquire-property predicate call 'inference path' and 'anchor instances' from the logical-form representation 356. Given the logical-form representation 356 of a subsequent dialogue sequence 'Inquire-Property(Employee, _id1, has_office.floor)', the NL2QL pair generation system 106 can generate the following natural language query according to the natural language query template 366: What is the has_office.floor of Employee _id1?. Then, substituting terms from the lexicon 304, the NL2QL pair generation system 106 can generate a sensible natural language query of What is the office floor of Thomas? as the natural language query 370.

In a same or similar manner, the NL2QL pair generation system 106 can generate the query-language representation 372 using the query-language representation template 368 of the NL2QL template 364. In particular, the NL2QL pair generation system 106 can ensure proper conversion in some implementations where multiple tables from the domain database are employed (e.g., the 'EmployeeTbl' and the 'OfficeTbl'). For example, given the foregoing logical-form representation 356 of a subsequent dialogue sequence 'Inquire-Property(Employee, _id1, has_office.floor)', the NL2QL pair generation system 106 can generate the following query-language representation according to the natural language query template 366: SELECT has_office.floor, FROM Employee and Office, WHERE Employee.id=_id1 and Employee.floor=_office1. Then, substituting terms from the lexicon 304 (and/or the domain database 306), the NL2QL pair generation system 106 can generate the query-language representation 372 comprising: SELECT office_id.floor, FROM EmployeeTbl and OfficeTbl, WHERE Employee.id=_id1 and Employee.floor=office1.

With the natural language query 370 and the query-language representation 372 generated, the NL2QL pair generation system 106 can then pair the natural language query 370 and the query-language representation 372 via a pairing 376 for providing to the NL2QL pair database 378 for storing therein. Although the pairing 376 is illustrated outside the NL2QL pair database 378, in some embodiments, the NL2QL pair generation system 106 performs the pairing 376 (or at least a portion of the pairing 376) inside the NL2QL pair database 378. For this reason, the pairing 376 is denoted in dashed lines. Indeed, numerous variations for the pairing 376 beyond that illustrated are herein contemplated for pairing the natural language query 370, the query-language representation 372, and any crowdsourced expressions from the third-party crowdsourcing system 374. For example, in some embodiments, the NL2QL pair generation system 106 may pair the natural language query 370 and the query-language representation 372 via the pairing 376 in an initial pairing outside the NL2QL pair database 378, and then pair (via the pairing 376) crowdsourced expressions from a third-party crowdsourcing system 374 with the initial pairing already stored within the NL2QL pair database 378.

As mentioned, in some embodiments, the NL2QL pair generation system 106 can instruct the third-party crowdsourcing system 374 to generate refined, paraphrased, or otherwise modified versions of the natural language query 370 as output by the NL2QL pair generation system 106. Albeit optional, the third-party crowdsourcing system 374 can generate additional or alternative versions of the natural language query 370 that are less awkward, more commonly used, or are more naturally phrased according to speech-based or text-based linguistics. In addition, the third-party crowdsourcing system 374 can complement and add variety to NL2QL pairs, thereby further improving the NL2QL pair database 378. After the third-party crowdsourcing system 374 generates these additional or alternative natural language expressions, the third-party crowdsourcing system 374 can transmit the expressions to the NL2QL pair generation system 106. In turn, the NL2QL pair generation system 106 can provide the natural language expressions from the third-party crowdsourcing system 374 to the NL2QL pair database 378 for pairing with the natural language query 370 and the query-language representation 372 (e.g., via the pairing 376).

As further shown in FIG. 3C, the NL2QL pair generation system 106 in some embodiments executes the query-language representation 372 via a query execution 380 in order to generate a response 382. In particular, via the query execution 380, the NL2QL pair generation system 106 can execute the query-language representation 372 against an input domain database (e.g., the domain database 206/306 discussed above). Accordingly, the response 382 comprises information returned from executing the query-language representation 372 against the domain database (e.g., an answer entity, answer instances, etc.).

In addition, the NL2QL pair generation system 106 can provide the response 382 to the contextualization model 332 for performing a context update according to context update rules (e.g., in a manner described above in relation to FIG. 3B and Table 1). Likewise, the NL2QL pair generation system 106 can provide one or more portions of the logical-form representation 356 to the contextualization model 332. In so doing, the NL2QL pair generation system 106 can provide, as applicable, question instances, a question entity, a question path, an answer entity, and/or answer instances for use in generating a next iteration of the contextual representation 334. That is, the NL2QL pair generation system 106 can iterate and therefore consider for the next iteration that the logical-form representation 356 and the response 382 correspond to a next iteration of the prior-generated dialogue sequence 330. In this manner, the NL2QL pair generation system 106 can generate as many related dialogue sequences as desired or configured, upon the last iteration of which concludes a dialogue session comprising multiple, related dialogue sequences (and moreover) multiple, related NL2QL pairs for use in training a NL2QL machine-learning model.

Figure 4:
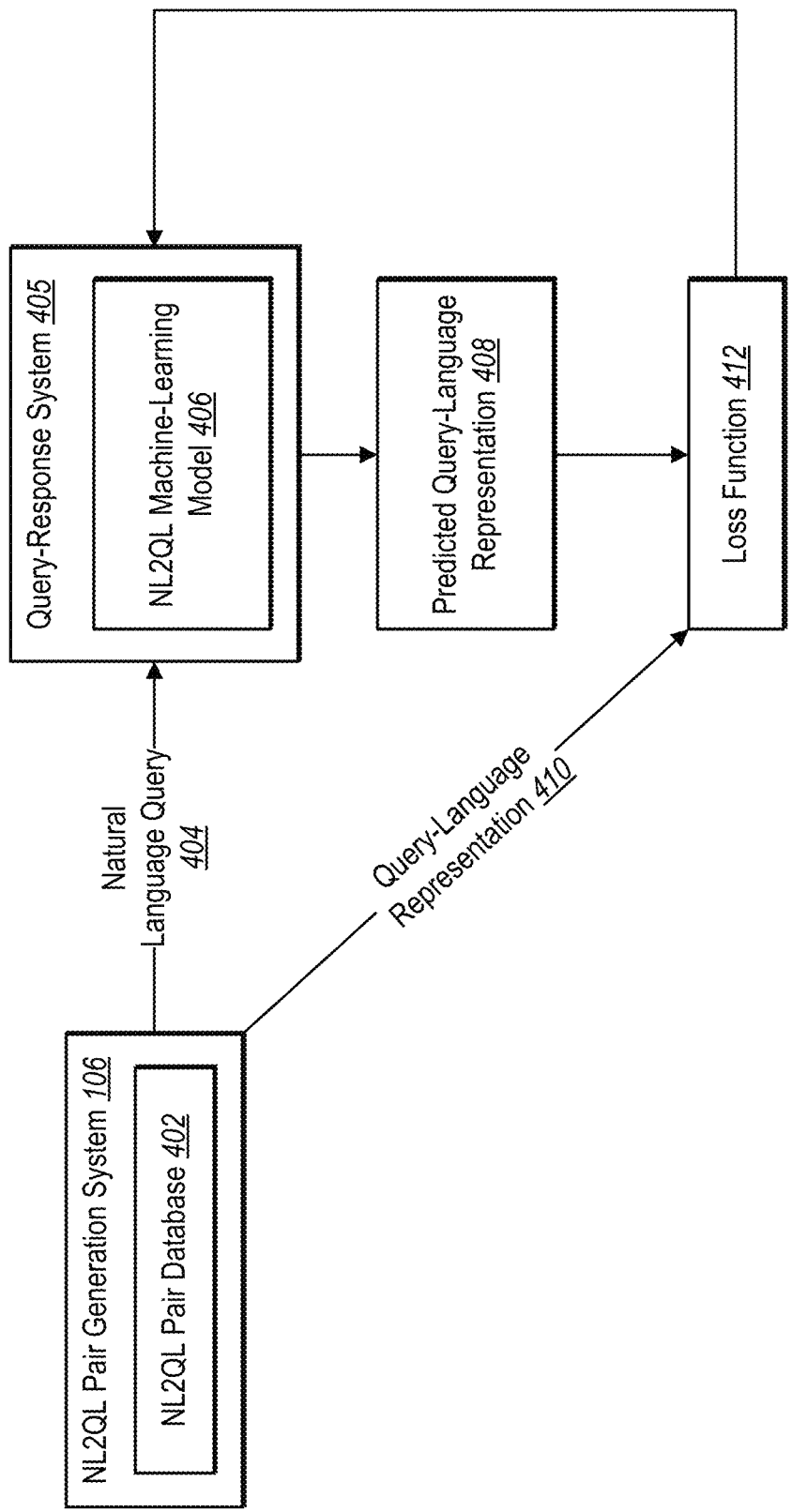
FIG. 4 illustrates an example process flow for learning parameters of a NL2QL machine-learning model based on NL2QL pairs from a NL2QL pair generation system in accordance with one or more embodiments.

As mentioned above, the NL2QL pair generation system 106 utilizes logical-form dialogue generation to enhance transferability across different software domains and for different machine-learning models. As such, FIG. 4 illustrates the NL2QL pair generation system 106 transmitting NL2QL pairs for learning parameters of (e.g., training) a NL2QL machine-learning model in accordance with one or more embodiments. To train the NL2QL machine-learning model 406 to generate query-language representations, a query-response system 405 can compare a predicted query-language representation 408 with a query-language representation 410 to determine a loss using a loss function 412. In particular, the query-response system 405 can compare, utilizing the loss function 412, predicted query-language representation probabilities for training natural language queries 404 with the query-language representation 410 comprising actual query-language representations generated via logical-form dialogue generation. In these or other embodiments, the loss function 412 can include, but is not limited to, a regression loss function (e.g., a mean square error function, a quadratic loss function, an L2 loss function, a mean absolute error/L1 loss function, mean bias error). Additionally, or alternatively, the loss function can include a classification loss function (e.g., a hinge loss/multi-class SVM loss function, cross entropy loss/negative log likelihood function).

Further, the NL2QL pair generation system 106 can utilize the loss function 412 to return quantifiable data regarding the difference between the predicted query-language representation 408 and the query-language representation 410. In particular, the NL2QL pair generation system 106 can utilize the loss function 412 to return such loss data to the query-response system 405 based upon which the query-response system 405 can adjust various parameters/hyperparameters to improve the quality/accuracy of the predicted query-language representation 408 in subsequent iterations—by narrowing the difference between the predicted query-language representation 408 and the query-language representation 410.

In some embodiments, the NL2QL pair generation system 106 can utilize an Adam optimizer for intelligently adjusting weights and various parameters/hyperparameters within the NL2QL machine-learning model 406. Moreover, the training of the NL2QL machine-learning model 406 can be an iterative process such that the query-response system 405 can continually adjust parameters/hyperparameters of the NL2QL machine-learning model 406 over training iterations. Once the parameters/hyperparameters for the NL2QL machine-learning model 406 are learned, the query-response system 405 can then apply natural language queries (e.g., in a live/online environment) to the NL2QL machine-learning model 406. Specifically, at the trained NL2QL machine-learning model 406, the query-response system 405 can, based on characteristics of a natural language query, determine a corresponding query-language representation to retrieve a response to the query and provide a reply to the natural language query based on the retrieved response.

As mentioned above, utilizing logical-form dialogue generation as disclosed herein provides several advantages over conventional systems, including increased levels of domain-independence, NL2QL pair accuracy, and model architecture. These and other advantages of the NL2QL pair generation system 106 in turn lend to improved NL2QL machine-learning models from training on enhanced training data comprising NL2QL pairs generated via logical-form dialogue construction. As such, FIG. 5 illustrates experimental results regarding the effectiveness of the NL2QL pair generation system 106 in accordance with one or more embodiments.

Figure 5:
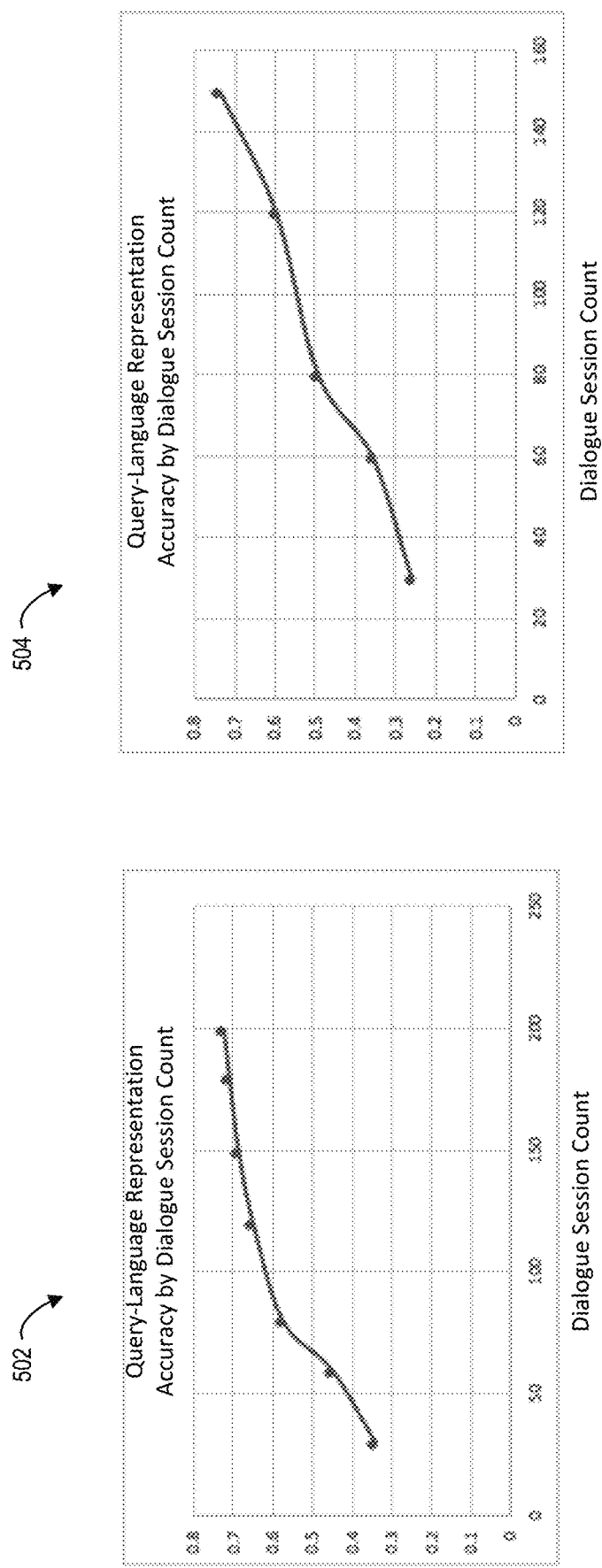
FIG. 5 illustrates charts reflecting example experimental results utilizing NL2QL pairs from a NL2QL pair generation system in accordance with one or more embodiments.

As shown in FIG. 5, accuracy chart 502 and accuracy chart 504 indicate an accuracy of query-language representations generated by a NL2QL machine-learning model trained on NL2QL pairs created via logical-form dialogue generation (e.g., as described above in relation to FIG. 4). In particular, both accuracy charts 502 and 504 indicate an increasing trend of accuracy as the dialogue session count increases (i.e., as the NL2QL pair generation system provides more and more NL2QL pairs for use in training the NL2QL machine-learning model).

Specifically, the accuracy chart 502 indicates an accuracy measurement of 0.726 for correctly generating the correct SPARQL query (i.e., query-language representation). This measurement is based on 200 dialogue sessions (averaging about three logical-form dialogue sequences per dialogue session) for the ADOBE® Photoshop KG domain of some 2,600 nodes and 15,400 edges (a graph-based domain database). Similarly, the accuracy chart 504 indicates an accuracy measurement of 0.738 for correctly generating the correct SPARQL query (i.e., query-language representation). This measurement is based on 150 dialogue sessions (averaging about three logical-form dialogue sequences per session) for the ADOBE® XDM domain (a table-based domain database). Accordingly, accuracy charts 502 and 504 indicate an ability of the NL2QL pair generation system 106 to facilitate large-scale training to quickly and accurately deploy a conversational NL2QL machine-learning model.

Figure 6:
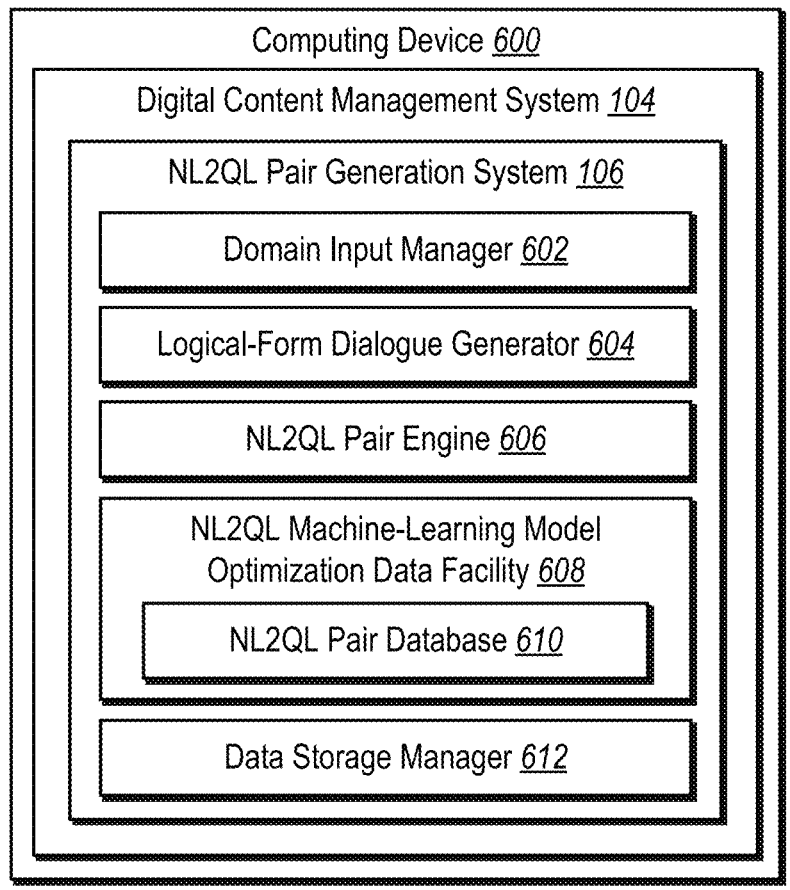
FIG. 6 illustrates a schematic diagram of a NL2QL pair generation system in accordance with one or more embodiments.

Turning to FIG. 6, additional detail will now be provided regarding various components and capabilities of the NL2QL pair generation system 106. In particular, FIG. 6 illustrates an example schematic diagram of the NL2QL pair generation system 106 implemented by a computing device 600 in accordance with one or more embodiments of the present disclosure. As shown, the NL2QL pair generation system 106 is further implemented by the server(s) 102 and the digital content management system 104. Also illustrated, the NL2QL pair generation system 106 can include a domain input manager 602, a logical-form dialogue generator 604, a NL2QL pair engine 606, a NL2QL machine-learning model optimization data facility 608, and a data storage manager 612.

The domain input manager 602 can obtain, send, receive, process, and/or analyze domain inputs as described in relation to the foregoing figures. In particular, the domain input manager 602 can extract data from a domain database, a domain ontology, and/or a lexicon as described above. In turn, the domain input manager 602 can transmit data to one or more other components of the computing device 600. For example, the domain input manager 602 can transmit data corresponding to the lexicon and/or the domain database to the NL2QL pair engine 606 for determining NL2QL pairs. Additionally or alternatively, the domain input manager 602 can transmit data corresponding to the domain ontology and/or the domain database to the logical-form dialogue generator 604 for generating logical-form representations of a subsequent dialogue sequence.

The logical-form dialogue generator 604 can generate logical-form representations of dialogue sequences as described in relation to the foregoing figures. In particular, the logical-form dialogue generator 604 can generate contextual representations of a prior-generated dialogue sequence for comparison with logical-form rules. Based on the comparison, the logical-form dialogue generator 604 can generate a logical-form representation for each logical-form rule. For example, in response to satisfying a trigger condition of a logical-form rule, the logical-form dialogue generator 604 can perform a corresponding logical-form action for constructing specific predicate arguments of a logical-form representation.

The NL2QL pair engine 606 can generate NL2QL pairs as described in relation to the foregoing figures. In particular, the NL2QL pair engine 606 can apply a NL2QL template to the logical-form representation constructed by the logical-form dialogue generator 604. For example, the NL2QL pair engine 606 can generate a natural language query and a query-language representation by utilizing a natural language query template and a query-language representation template, respectively. Additionally, in some embodiments, the NL2QL pair engine 606 can utilize a lexicon for converting predicate argument terms from the logical-form representation to appropriate terms for the natural language query and the query-language representation.

The NL2QL machine-learning model optimization data facility 608 can obtain, send, receive, process, manage, and/or analyze training of a NL2QL machine-learning model as described in relation to the foregoing figures. In particular, the NL2QL machine-learning model optimization data facility 608 comprises a NL2QL pair database 610 as also described above. Utilizing the NL2QL pair database 610, the NL2QL machine-learning model optimization data facility 608 can, for example, train a NL2QL machine-learning model based on NL2QL pairs generated from logical-form dialogue representations.

The data storage manager 612 maintains data for the NL2QL pair generation system 106. The data storage manager 612 (e.g., via one or more memory devices) can maintain data of any type, size, or kind, as necessary to perform the functions of the NL2QL pair generation system 106. For example, the data storage manager 612 may store various rules and/or parameters for performing logical-form dialogue generation as disclosed herein.

Each of the components of the computing device 600 can include software, hardware, or both. For example, the components of the computing device 600 can include one or more instructions stored on a computer-readable storage medium and executable by processors of one or more computing devices, such as a client device or server device. When executed by the one or more processors, the computer-executable instructions of the NL2QL pair generation system 106 can cause the computing device(s) (e.g., the computing device 600) to perform the methods described herein. Alternatively, the components of the computing device 600 can include hardware, such as a special-purpose processing device to perform a certain function or group of functions. Alternatively, the components of the computing device 600 can include a combination of computer-executable instructions and hardware.

Furthermore, the components of the computing device 600 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 600 may be implemented as a stand-alone application, such as a desktop or mobile application. Furthermore, the components of the computing device 600 may be implemented as one or more web-based applications hosted on a remote server.

The components of the computing device 600 may also be implemented in a suite of mobile device applications or "apps." To illustrate, the components of the computing device 600 may be implemented in an application, including but not limited to ADOBE® PHOTOSHOP, ADOBE® EXPERIENCE DATA MODEL, ADOBE® ANALYTICS, ADOBE® AUDIENCE MANAGER, ADOBE® EXPERIENCE MANAGER, ADOBE® CAMPAIGN, ADOBE® ADVERTISING, ADOBE® TARGET, or ADOBE® COMMERCE CLOUD. Product names, including "ADOBE" and any other portion of one or more of the foregoing product names, may include registered trademarks or trademarks of Adobe Inc. in the United States and/or other countries.

Figure 7:
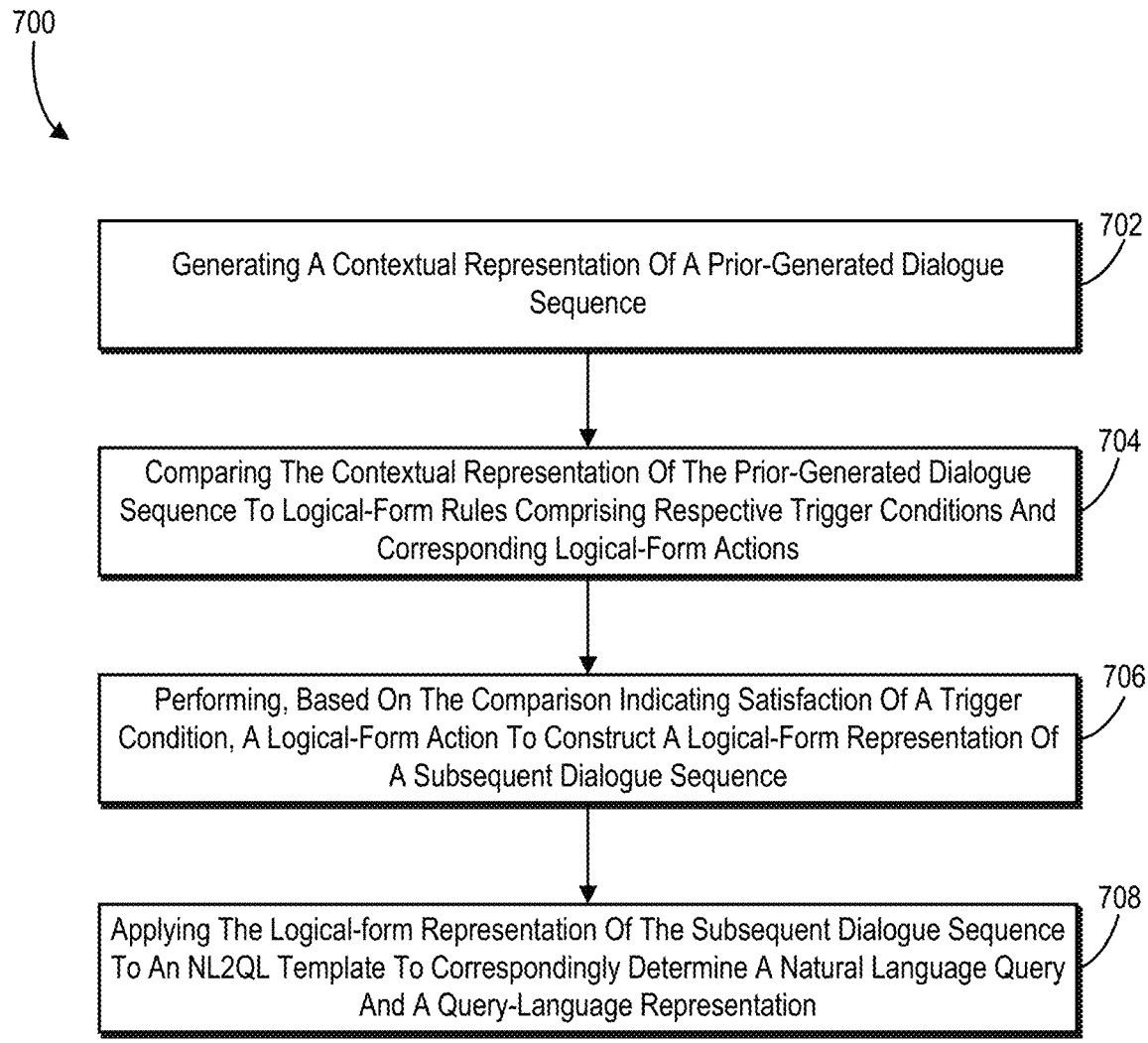
FIG. 7 illustrates a flowchart of a series of acts for generating NL2QL pairs in accordance with one or more embodiments.

FIGS. 1-6, the corresponding text, and the examples provide several different systems, methods, techniques, components, and/or devices of the NL2QL pair generation system 106 in accordance with one or more embodiments. In addition to the above description, one or more embodiments can also be described in terms of flowcharts including acts for accomplishing a particular result. For example, FIG. 7 illustrates a flowchart of a series of acts 700 for generating NL2QL pairs in accordance with one or more embodiments. The NL2QL pair generation system 106 may perform one or more acts of the series of acts 700 in addition to or alternatively to one or more acts described in conjunction with other figures. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown, the series of acts 700 includes an act 702 of generating a contextual representation of a prior-generated dialogue sequence. In some embodiments, generating the contextual representation of the prior-generated dialogue sequence comprises (i) determining a first set of contextual predicate arguments comprising one or more of a question instance, a question entity, or a question path, and (ii) determining a second set of contextual predicate arguments from a response to the prior-generated dialogue sequence, the second set of contextual predicate arguments comprising one or both of an answer instance or an answer entity.

The series of acts 700 further includes an act 704 of comparing the contextual representation of the prior-generated dialogue sequence to logical-form rules comprising respective trigger conditions and corresponding logical-form actions. In some embodiments, comparing the contextual representation of the prior-generated dialogue sequence to the logical-form rules comprises comparing one or more contextual predicate arguments of the prior-generated dialogue sequence with the respective trigger conditions of the logical-form rules.

The series of acts 700 further includes an act 706 of performing, based on the comparison indicating satisfaction of a trigger condition, a logical-form action to construct a logical-form representation of a subsequent dialogue sequence. In some embodiments, performing the logical-form action comprises populating predicate arguments of the logical-form representation of the subsequent dialogue sequence according to instructions from the logical-form action. In addition, the series of acts 700 further includes an act 708 of applying the logical-form representation of the subsequent dialogue sequence to the NL2QL template to correspondingly determine a natural language query and a query-language representation.

It is understood that the outlined acts in the series of acts 700 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 7, act(s) in the series of acts 700 may include constructing a logical-form representation of an initial dialogue sequence by selecting a predicate and one or more predicate arguments. As another example of an additional act not shown in FIG. 7, act(s) in the series of acts 700 may include providing the query-language representation together with the natural language query to a NL2QL pair database.

In yet another example of an additional act not shown in FIG. 7, act(s) in the series of acts 700 may include (i) providing the natural language query to a NL2QL machine-learning model to predict a query-language representation of the natural language query, (ii) comparing the predicted query-language representation as output from the NL2QL machine-learning model with the query-language representation from the query-language-response-database to determine a loss, and (iii) modifying one or more parameters of the NL2QL machine-learning model based on the loss. As a further example of an additional act not shown in FIG. 7, act(s) in the series of acts 700 may include providing one or more crowdsourced expressions of the natural language query to the NL2QL pair database for pairing with the natural language query and the query-language representation.

In addition (or in the alternative) to the acts described above, in some embodiments, the series of acts 700 can include performing a step for constructing a logical-form representation of a subsequent dialogue sequence based on a prior-generated dialogue sequence. For instance, the acts and algorithms described above in relation to FIGS. 3A, 3B, and 3C can comprise the corresponding acts (or structure) for a step for constructing a logical-form representation of a subsequent dialogue sequence based on a prior-generated dialogue sequence.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
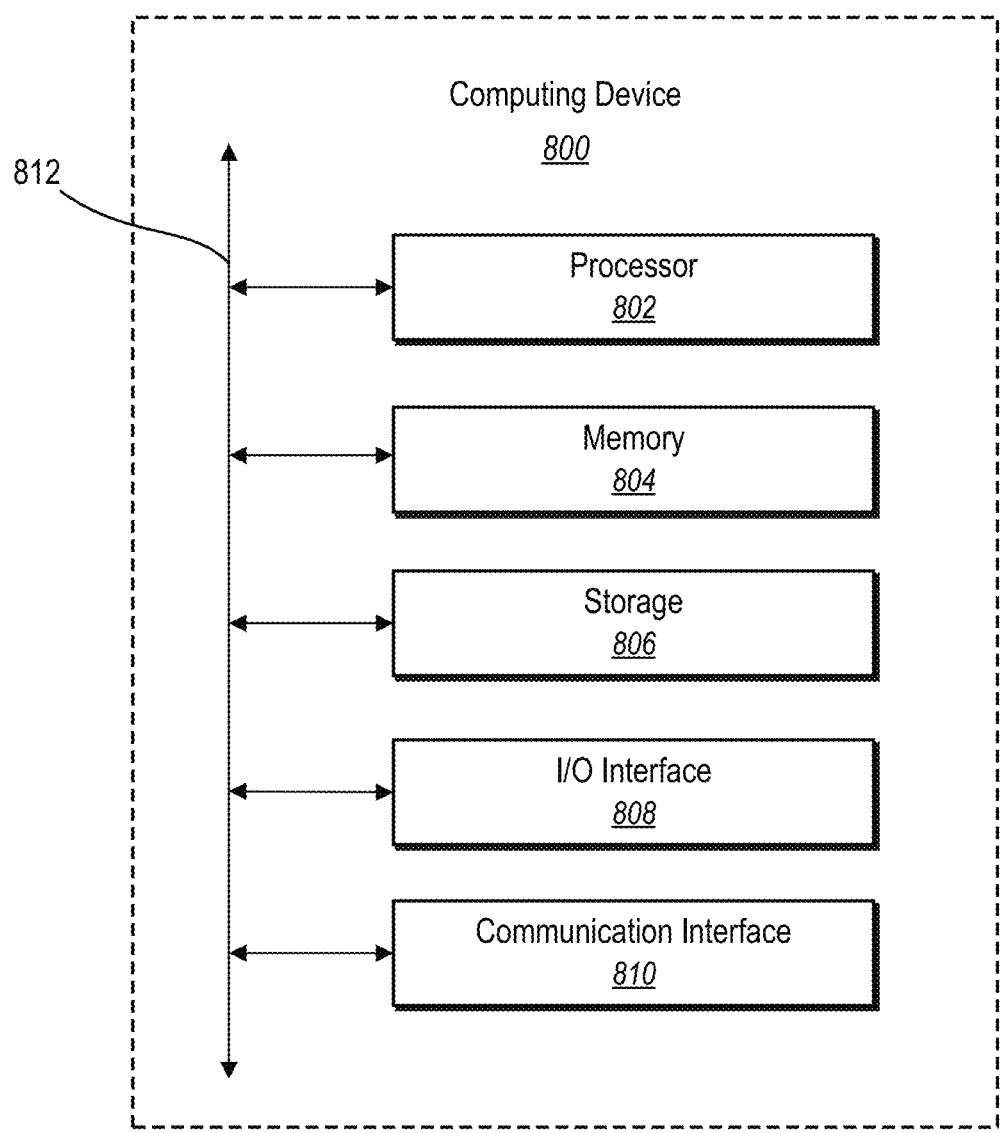
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., the computing device 600, the server(s) 102, the third-party server 112, and/or the client device 108). In one or more embodiments, the computing device 800 may be a mobile device (e.g., a mobile telephone, a smartphone, a PDA, a tablet, a laptop, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of the computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
    one or more memory devices comprising a natural-language-to-query-language (NL2QL) template; and
    one or more computing devices configured to cause the system to:
        generate a contextual representation of a prior-generated dialogue sequence;
        compare the contextual representation of the prior-generated dialogue sequence to logical-form rules comprising respective trigger conditions and corresponding logical-form actions;
        based on comparing the contextual representation of the prior-generated dialogue sequence to the logical-form rules, generate a logical-form representation transferrable across domains and comprising a set of domain-independent predicate arguments populatable with argument values specific to domain contexts for constructing subsequent dialogue sequences in domains corresponding to the domain contexts;
        perform, based on determining a first trigger condition is satisfied from comparing the contextual representation to the logical-form rules, a first logical-form action to populate a first domain-independent predicate argument of the logical-form representation with a first argument value from the contextual representation for a first subsequent dialogue sequence comprising a first predicate type and a first query type;
        perform, based on determining a second trigger condition is satisfied from comparing the contextual representation to the logical-form rules, a second logical-form action to populate a second domain-independent predicate argument of the logical-form representation with a second argument value from the contextual representation for a second subsequent dialogue sequence comprising a second predicate type and a second query type; and
        apply the first domain-independent predicate argument of the logical-form representation for the first subsequent dialogue sequence and the second domain-independent predicate argument of the logical-form representation for the second subsequent dialogue sequence to the NL2QL template to correspondingly determine natural language queries and query-language representations.

2. The system of claim 1, wherein the one or more computing devices are further configured to cause the system to generate the logical-form representation by utilizing a logical-form specification that defines:
    a set of domain-independent predicates;
    the set of domain-independent predicate arguments corresponding to the set of domain-independent predicates; and
    a set of domain-independent value types corresponding to the set of domain-independent predicate arguments.

3. The system of claim 1, wherein the one or more computing devices are further configured to cause the system to generate the contextual representation of the prior-generated dialogue sequence by:
    determining a first set of contextual predicate arguments comprising one or more of a question instance, a question entity, or a question path; and
    determining a second set of contextual predicate arguments from a response to the prior-generated dialogue sequence, the second set of contextual predicate arguments comprising one or both of an answer instance or an answer entity.

4. The system of claim 1, wherein the one or more computing devices are further configured to cause the system to compare the contextual representation of the prior-generated dialogue sequence to the logical-form rules by comparing one or more contextual predicate arguments of the prior-generated dialogue sequence with the respective trigger conditions of the logical-form rules.

5. The system of claim 1, wherein the one or more computing devices are further configured to cause the system to perform a logical-form action by populating predicate arguments of the logical-form representation of a subsequent dialogue sequence according to instructions from the logical-form action.

6. The system of claim 1, wherein the one or more computing devices are further configured to cause the system to provide the query-language representations together with the natural language queries to an NL2QL pair database.

7. The system of claim 6, wherein the one or more computing devices are further configured to cause the system to:
    provide a natural language query to a NL2QL machine-learning model to predict a query-language representation of the natural language query;
    compare the predicted query-language representation as output from the NL2QL machine-learning model with a query-language representation from the NL2QL pair database to determine a loss; and
    modify one or more parameters of the NL2QL machine-learning model based on the loss.

8. The system of claim 6, wherein the one or more computing devices are further configured to cause the system to provide one or more crowdsourced expressions of the natural language queries to the NL2QL pair database for pairing with the natural language queries and the query-language representations.

9. A non-transitory computer-readable medium storing instructions that, when executed by at least one processor, cause a computing device to:
generate a contextual representation of a prior-generated dialogue sequence by determining a first set of contextual predicate arguments comprising one or more of a question instance, a question entity, or a question path;
compare the contextual representation of the prior-generated dialogue sequence to logical-form rules comprising respective trigger conditions and corresponding logical-form actions;
based on comparing the contextual representation of the prior-generated dialogue sequence to the logical-form rules, generate a logical-form representation transferrable across domains and comprising a set of domain-independent predicate arguments populatable with argument values specific to domain contexts for constructing subsequent dialogue sequences in domains corresponding to the domain contexts;
perform, based on determining a first trigger condition is satisfied from comparing the contextual representation to the logical-form rules, a first logical-form action to populate a first domain-independent predicate argument of the logical-form representation with a first argument value from the contextual representation for a first subsequent dialogue sequence comprising a first predicate type and a first query type;
perform, based on determining a second trigger condition is satisfied from comparing the contextual representation to the logical-form rules, a second logical-form action to populate a second domain-independent predicate argument of the logical-form representation with a second argument value from the contextual representation for a second subsequent dialogue sequence comprising a second predicate type and a second query type;
apply the first domain-independent predicate argument of the logical-form representation of the first subsequent dialogue sequence and the second domain-independent predicate argument of the logical-form representation for the second subsequent dialogue sequence to an NL2QL template to correspondingly determine natural language queries and query-language representations; and
provide the natural language queries and the query-language representations to a NL2QL pair database.

10. The non-transitory computer-readable medium of claim 9, further comprising instructions that, when executed by the at least one processor, cause the computing device to generate the logical-form representation by selecting a predicate and one or more predicate arguments from an initial dialogue sequence.

11. The non-transitory computer-readable medium of claim 9, further comprising instructions that, when executed by the at least one processor, cause the computing device to generate the contextual representation of the prior-generated dialogue sequence by determining a second set of contextual predicate arguments from a response to the prior-generated dialogue sequence, the second set of contextual predicate arguments comprising one or both of an answer instance or an answer entity.

12. The non-transitory computer-readable medium of claim 9, further comprising instructions that, when executed by the at least one processor, cause the computing device to compare the contextual representation of the prior-generated dialogue sequence to the logical-form rules by comparing one or more contextual predicate arguments of the prior-generated dialogue sequence with the respective trigger conditions of the logical-form rules.

13. The non-transitory computer-readable medium of claim 9, further comprising instructions that, when executed by the at least one processor, cause the computing device to perform a logical-form action by populating predicate arguments of the logical-form representation of a subsequent dialogue sequence according to instructions from the logical-form action.

14. The non-transitory computer-readable medium of claim 9, further comprising instructions that, when executed by the at least one processor, cause the computing device to:
provide a natural language query to a NL2QL machine-learning model to predict a query-language representation of the natural language query;
compare the predicted query-language representation as output from the NL2QL machine-learning model with a query-language representation from the NL2QL pair database to determine a loss; and
modify one or more parameters of the NL2QL machine-learning model based on the loss.

15. The non-transitory computer-readable medium of claim 9, further comprising instructions that, when executed by the at least one processor, cause the computing device to provide one or more crowdsourced expressions of the natural language queries to the NL2QL pair database for pairing with the natural language queries and the query-language representations.

16. A computer-implemented method comprising:
generating a contextual representation of a prior-generated dialogue sequence;
comparing the contextual representation of the prior-generated dialogue sequence to logical-form rules comprising respective trigger conditions and corresponding logical-form actions;
based on comparing the contextual representation of the prior-generated dialogue sequence to the logical-form rules, generate a logical-form representation transferrable across domains and comprising a set of domain-independent predicate arguments populatable with argument values specific to domain contexts for constructing subsequent dialogue sequences in domains corresponding to the domain contexts;
performing, based on determining a first trigger condition is satisfied from comparing the contextual representation to the logical-form rules, a first logical-form action to populate a first domain-independent predicate argument of the logical-form representation with a first argument value from the contextual representation for a first subsequent dialogue sequence comprising a first predicate type and a first query type;
performing, based on determining a second trigger condition is satisfied from comparing the contextual representation to the logical-form rules, a second logical-form action to populate a second domain-independent predicate argument of the logical-form representation with a second argument value from the contextual representation for a second subsequent dialogue sequence comprising a second predicate type and a second query type; and
applying the first domain-independent predicate argument of the logical-form representation for the first subsequent dialogue sequence and the second domain-independent predicate argument of the logical-form representation for the second subsequent dialogue sequence to an NL2QL template to correspondingly determine natural language queries and query-language representations.

17. The computer-implemented method of claim 16, wherein generating the logical-form representation comprises utilizing a logical-form specification that defines:
   a set of domain-independent predicates;
   the set of domain-independent predicate arguments corresponding to the set of domain-independent predicates; and
   a set of domain-independent value types corresponding to the set of domain-independent predicate arguments.

18. The computer-implemented method of claim 16, further comprising providing one or more crowdsourced expressions of a natural language query to an NL2QL pair database for pairing with the natural language query and a query-language representation.

19. The computer-implemented method of claim 16, further comprising:
   providing a natural language query to a NL2QL machine-learning model to predict a query-language representation of a natural language query;
   comparing the predicted query-language representation as output from the NL2QL machine-learning model with the query-language representation from an NL2QL pair database to determine a loss; and
   modifying one or more parameters of the NL2QL machine-learning model based on the loss.

20. The computer-implemented method of claim 16, wherein applying the logical-form representation of a subsequent dialogue sequence to the NL2QL template comprises applying predicate argument values to the NL2QL template.

* * * * *